US011983013B2

(12) United States Patent
Osawa et al.

(10) Patent No.: US 11,983,013 B2
(45) Date of Patent: May 14, 2024

(54) TRAVELING PARAMETER OPTIMIZATION SYSTEM AND TRAVELING PARAMETER OPTIMIZATION METHOD

(71) Applicant: SHARP KABUSHIKI KAISHA, Sakai (JP)

(72) Inventors: Hiroki Osawa, Sakai (JP); Thinh Nguyenquang, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 318 days.

(21) Appl. No.: 17/412,096

(22) Filed: Aug. 25, 2021

(65) Prior Publication Data

US 2022/0073105 A1   Mar. 10, 2022

(30) Foreign Application Priority Data

Sep. 9, 2020   (JP) .................................. 2020-151056

(51) Int. Cl.
  *G05D 1/00*   (2024.01)
  *G05D 107/70*   (2024.01)
(52) U.S. Cl.
  CPC ....... *G05D 1/0221* (2013.01); *G05D 2107/70* (2024.01)
(58) Field of Classification Search
  None
  See application file for complete search history.

(56) References Cited

U.S. PATENT DOCUMENTS

| | | | |
|---|---|---|---|
| 5,218,542 A | 6/1993 | Endo et al. | |
| 2016/0297429 A1* | 10/2016 | Watts | G05D 1/0011 |
| 2017/0344007 A1* | 11/2017 | Song | G05D 1/0217 |

(Continued)

FOREIGN PATENT DOCUMENTS

| | | | | |
|---|---|---|---|---|
| CN | 110703756 A | * | 1/2020 | G05D 1/02 |
| EP | 3875908 A1 | * | 9/2021 | G01C 21/36 |

(Continued)

OTHER PUBLICATIONS

Chen et al., "An Improved PID Control for Wheeled Line-Tracking Robot", Applied Mechanics and Materials vols. 401-403 (2013) pp. 1661-1665 Online available since Sep. 3, 2013 at www.scientific.net (Year: 2013).*

*Primary Examiner* — Amelia Vorce
(74) *Attorney, Agent, or Firm* — ScienBiziP, P.C.

(57) ABSTRACT

An optimization system includes an optimization server and a management server, and the management server controls an AGV. The AGV transports a cargo and notifies the management server of a traveling state during traveling. The management server stores the traveling state of the AGV in a database. The optimization server estimates the traveling parameter to be used for the subsequent experimental traveling and repeats an experiment based on an experiment design for experimental traveling and the number of times of back-and-forth sway and the right-and-left sway width of the AGV when the AGV travels by using the traveling parameter estimated from the default value of the traveling parameter and an experiment result of the experimental traveling of the AGV. After the experiment ends, the optimization server optimizes the traveling parameter for each traveling state of the AGV based on the experiment result.

18 Claims, 18 Drawing Sheets

(56) References Cited

U.S. PATENT DOCUMENTS

| | | | |
|---|---|---|---|
| 2020/0011282 A1 | 1/2020 | Wakasugi | |
| 2020/0181879 A1 | 6/2020 | Halder et al. | |
| 2020/0348324 A1* | 11/2020 | Wikholm | C12M 23/50 |
| 2021/0026366 A1* | 1/2021 | Horesh | G05D 1/0234 |
| 2021/0087033 A1* | 3/2021 | Kimura | G06N 20/00 |
| 2021/0110089 A1* | 4/2021 | Chen | G06T 7/0004 |
| 2021/0213932 A1* | 7/2021 | Aggoune | B60W 20/12 |
| 2021/0284262 A1* | 9/2021 | Sardes | G06Q 50/30 |
| 2021/0302981 A1* | 9/2021 | Case | G05D 1/0088 |
| 2021/0388577 A1* | 12/2021 | Eklund | G05D 1/0217 |
| 2022/0009471 A1* | 1/2022 | Sjödin | B60K 17/354 |
| 2023/0234237 A1* | 7/2023 | Wu | G05D 1/0234 |
| | | | 700/245 |

FOREIGN PATENT DOCUMENTS

| | | |
|---|---|---|
| JP | H03-282705 A | 12/1991 |
| JP | 2000-148247 A | 5/2000 |
| JP | 2003-186538 A | 7/2003 |
| JP | 2018-137857 A | 8/2018 |
| WO | WO-2018051081 A1 * 3/2018 | ........... G05D 1/0246 |

\* cited by examiner

FIG. 12

TRAVELING PARAMETER

| PARAMETER NAME | MINIMUM VALUE | MAXIMUM VALUE | REPRESEN-TATIVE VALUE |
|---|---|---|---|
| TRACK SHIFT AMOUNT, P GAIN ADJUSTMENT (EACH VELOCITY) | 0 | 10 | 4 |
| TRACK SHIFT AMOUNT, I GAIN ADJUSTMENT (EACH VELOCITY) | 0 | 10 | 1.5 |
| TRACK SHIFT AMOUNT, D GAIN ADJUSTMENT (EACH VELOCITY) | 0 | 10 | 0.1 |
| MOTOR ROTATION NUMBER, P GAIN ADJUSTMENT (EACH VELOCITY) | 0 | 10 | 4 |
| MOTOR ROTATION NUMBER, I GAIN ADJUSTMENT (EACH VELOCITY) | 0 | 10 | 1.5 |
| MOTOR ROTATION NUMBER, D GAIN ADJUSTMENT (EACH VELOCITY) | 0 | 10 | 0.1 |
| AGV TRAVELING VELOCITY (EACH WEIGHT) | 5 | 100 | 20 |
| ACCELERATION RATE (EACH WEIGHT) | 50 | 700 | 100 |
| DECELERATION RATE (EACH WEIGHT) | 100 | 1000 | 300 |
| SPIN VELOCITY (EACH WEIGHT) | 10 | 100 | 30 |
| SPIN ACCELERATION RATE (EACH WEIGHT) | 10 | 500 | 30 |
| STOP DISTANCE DURING DERAILMENT (EACH WEIGHT) | 0 | 1000 | 500 |
| STOP DECELERATION RATE DUE TO OBSTACLE DETECTION (EACH WEIGHT) | 100 | 1000 | 300 |
| OBSTACLE SENSOR DETECTION AREA SHAPE | – | – | – |
| ⋮ | ⋮ | ⋮ | ⋮ |

FIG. 14

OPTIMIZATION PARAMETER TABLE

| TRAVELING ROUTE ID | TRAVELING PARAMETER TABLE |
|---|---|
| A | TRAVELING PARAMETER TABLE A |
| B | TRAVELING PARAMETER TABLE B |
| C | TRAVELING PARAMETER TABLE C |
| ⋮ | ⋮ |
| T | TRAVELING PARAMETER TABLE T |

FIG. 15

TRAVELING PARAMETER TABLE A

| VELOCITY (m/min) \ LOAD(kg) | 0~5 | 5~10 | 10~15 | 15~20 |
|---|---|---|---|---|
| 0~50 | A11 | A12 | A13 | A14 |
| 50~100 | A21 | A22 | A23 | A24 |
| 100~150 | A31 | A32 | A33 | A34 |
| 150~200 | A41 | A42 | A43 | A44 |

TRAVELING PARAMETER OPTIMIZATION SYSTEM AND TRAVELING PARAMETER OPTIMIZATION METHOD

BACKGROUND OF THE INVENTION

Field of the Invention

The present invention relates to a traveling parameter optimization system and a traveling parameter optimization method and, in particular, for example, to a traveling parameter optimization system and a traveling parameter optimization method for optimizing a traveling parameter of an automatic traveling device.

Description of the Background Art

Automatic transport systems using an unmanned transport vehicle are used at factories or warehouses. The unmanned transport vehicle travels autonomously along a designated traveling route.

Japanese Unexamined Patent Application Publication No. 03-282705 and Japanese Unexamined Patent Application Publication No. 2000-148247 each disclose a method for controlling the steering angle of a wheel so as to cause an unmanned transport vehicle including a plurality of wheels to travel successfully along a line (also referred to as a guide line or a guide).

Japanese Unexamined Patent Application Publication No. 03-282705 discloses that, as steering control along a guide line may be difficult or hunting may occur with the conventional control system due to the nonlinearity of the control system, fuzzy inference is applied so as to control the steering angle based on an inference result.

Japanese Unexamined Patent Application Publication No. 2000-148247 discloses a method for, in a three-wheel steering unmanned forklift (unmanned transport vehicle), controlling the steering of each of three wheels in order to reduce overshoot during the steering control for traveling along the guide, shorten the correction distance, and reduce the vehicle body posture movement.

Japanese Unexamined Patent Application Publication No. 2018-137857 discloses a method for calculating, based on machine learning, the model formula representing the relationship between the error between a predetermined stop position and the actual stop position of a vehicle, which indicates a result of automatic stopping control to stop the vehicle at the predetermined stop position using a traveling condition parameter, and the traveling condition parameter used for the automatic stopping control.

In order for an unmanned transport vehicle to travel along a traveling route, there is a need for highly complicated traveling control using a large number of sufficiently optimized traveling parameters. However, there is a disadvantage such that the optimization of the traveling parameters requires tasks for repeated experimental traveling and data collection and accordingly a significant amount of work and time are needed.

The traveling control methods disclosed in Japanese Unexamined Patent Application Publication No. 03-282705 and Japanese Unexamined Patent Application Publication No. 2000-148247 described above do not consider the measures to reduce the work and time required for the optimization of the traveling parameters, even though an enormous number of traveling parameters is used for traveling control and a significant amount of work and time is needed for the optimization of the traveling parameters.

On the other hand, Japanese Unexamined Patent Application Publication No. 2018-137857, which it is considered may reduce the work and time required for the optimization of traveling parameters as compared to Japanese Unexamined Patent Application Publication No. 03-282705 and Japanese Unexamined Patent Application Publication No. 2000-148247 described above due to the estimation of the stop error based on the model formula calculated by machine learning, is to optimize the traveling parameters by using the experiment result data in the past rather than creating a future experiment design and efficiently acquiring experiment result data based on the created experiment design. Therefore, there is room for improvement in the adjustment of the parameters.

Thus, the principal object of the present invention is to provide a novel traveling parameter optimization system and traveling parameter optimization method.

Another object of the present invention is to provide a traveling parameter optimization system and a traveling parameter optimization method with which it is possible to efficiently improve the appropriateness of a parameter.

SUMMARY OF THE INVENTION

A first invention is a traveling parameter optimization system that optimizes a traveling parameter of an automatic traveling device that travels in accordance with a traveling instruction, by conducting experimental traveling for optimizing the traveling parameter of the automatic traveling device, the traveling parameter optimization system including: the automatic traveling device; an experimental traveling design creation device that creates an experimental traveling design for the experimental traveling; a traveling instruction device that transmits the traveling instruction to the automatic traveling device based on the experimental traveling design created by the experimental traveling design creation device; an acquisition device that acquires a measurement value that reflects a traveling state of the automatic traveling device; an evaluation value calculation device that calculates an evaluation value based on the measurement value acquired by the acquisition device; and a traveling parameter optimization device that calculates an optimized traveling parameter based on the evaluation value calculated by the evaluation value calculation device for the experimental traveling.

In a second invention according to the first invention, the experimental traveling design creation device designs, as the experimental traveling design, multiple number of times of traveling in which the traveling parameter is changed for each traveling.

In a third invention according to the second invention, the traveling parameter includes sets of multiple types of parameters for performing different controls during traveling of the automatic traveling device, and the experimental traveling design creation device designs multiple number of times of traveling to designate some among all the multiple types of parameters as a traveling parameter that is an optimization target and change the designated traveling parameter for each traveling so as to optimize the designated traveling parameter.

In a fourth invention according to the third invention, the experimental traveling design creation device designs multiple number of times of traveling as traveling to optimize the designated traveling parameter without changing a traveling parameter other than the designated traveling parameter among all the multiple types of parameters for each traveling.

In a fifth invention according to the third invention or the fourth invention, the experimental traveling design creation device creates multiple number of times of traveling as traveling to change the parameter designated as the traveling parameter that is the optimization target among all the multiple types of parameters so as to optimize the designated traveling parameter with respect to the each designated traveling parameter.

In a sixth invention according to any of the first invention to the fifth invention, the experimental traveling design creation device creates the experimental traveling design by a design of experiments method using a Bayesian optimization method.

In a seventh invention according to any of the first invention to the sixth invention, the experimental traveling design creation device uses the traveling parameter for each traveling from first traveling to N-th traveling as an explanatory variable, uses the evaluation value for each traveling from the first traveling to the N-th traveling as an objective variable, constructs a regression model by Gaussian process regression, calculates an acquisition function based on the regression model, and determines a traveling parameter for N+1-th traveling based on the acquisition function.

In an eighth invention according to any of the first invention to the seventh invention, the traveling parameter optimization device calculates the optimized traveling parameter using a Bayesian optimization method.

In a ninth invention according to any of the first invention to the eighth invention, the traveling parameter optimization device uses the traveling parameter for each traveling from first traveling to M-th traveling as an explanatory variable, uses the evaluation value for each traveling from the first traveling to the M-th traveling as an objective variable, constructs a regression model by Gaussian process regression, and calculates, as the optimized traveling parameter, a traveling parameter with which an expected value of the objective variable is closest to a setting value based on the regression model.

In a tenth invention according to any of the first invention to the ninth invention, a traveling parameter storage that stores a past traveling parameter calculated in past by the traveling parameter optimization device is further included, and the experimental traveling design creation device is capable of setting the past traveling parameter stored in the traveling parameter storage as a default value of a traveling parameter to create the experimental traveling design for the experimental traveling.

In an eleventh invention according to any of the first invention to the tenth invention, the traveling parameter is a different traveling parameter set for each class of a load, which is a weight of a cargo pulled or loaded by the automatic traveling device, and the traveling parameter is optimized for each class of the load as an optimization target.

In a twelfth invention according to any of the first invention to the eleventh invention, the traveling parameter is a different traveling parameter set for each class of a velocity, and the traveling parameter is optimized for each class of the velocity as an optimization target.

In a thirteenth invention according to any of the first invention to the twelfth invention, the traveling parameter is a different traveling parameter set for each traveling route, and the traveling parameter is optimized for the each traveling route as an optimization target.

In a fourteenth invention according to the thirteenth invention, the traveling instruction device transmits the traveling instruction to the automatic traveling device so as to cause the automatic traveling device to travel along the traveling route as the optimization target.

In a fifteenth invention according to any of the first invention to the fourteenth invention, the evaluation value includes a lateral shift amount with respect to a designated linear traveling route when the automatic traveling device travels along the linear traveling route.

In a sixteenth invention according to any of the first invention to the fifteenth invention, the evaluation value includes a magnitude of change in an acceleration rate due to acceleration or deceleration when the automatic traveling device travels.

In a seventeenth invention according to any of the first invention to the sixteenth invention, the traveling parameter includes a parameter for steering control when the automatic traveling device travels along a designated linear traveling route.

In an eighteenth invention according to any of the first invention to the seventeenth invention, the traveling parameter includes a parameter for acceleration rate control on acceleration or deceleration when the automatic traveling device travels.

A nineteenth invention is a traveling parameter optimization method for optimizing a traveling parameter of an automatic traveling device that travels in accordance with a traveling instruction, by conducting experimental traveling for optimizing the traveling parameter of the automatic traveling device, the traveling parameter optimization method including: (a) creating an experimental traveling design for the experimental traveling; (b) transmitting the traveling instruction to the automatic traveling device based on the experimental traveling design created at (a); (c) acquiring a measurement value that reflects a traveling state of the automatic traveling device; (d) calculating an evaluation value based on the measurement value acquired at (c); and (e) calculating an optimized traveling parameter based on the evaluation value calculated at (d) for the experimental traveling.

According to the present invention, the experiment result is efficiently acquired based on the future experiment design, and the traveling parameter is optimized based on the acquired experiment result, whereby the appropriateness of the parameter may be efficiently improved.

BRIEF DESCRIPTION OF THE DRAWINGS

FIG. 12 is a table illustrating a part of traveling parameters set for the AGV.

FIG. 14 is a table illustrating an example of an optimization parameter table.

FIG. 15 is a table illustrating an example of a traveling parameter table A.

DESCRIPTION OF THE PREFERRED EMBODIMENTS

Figure 1:
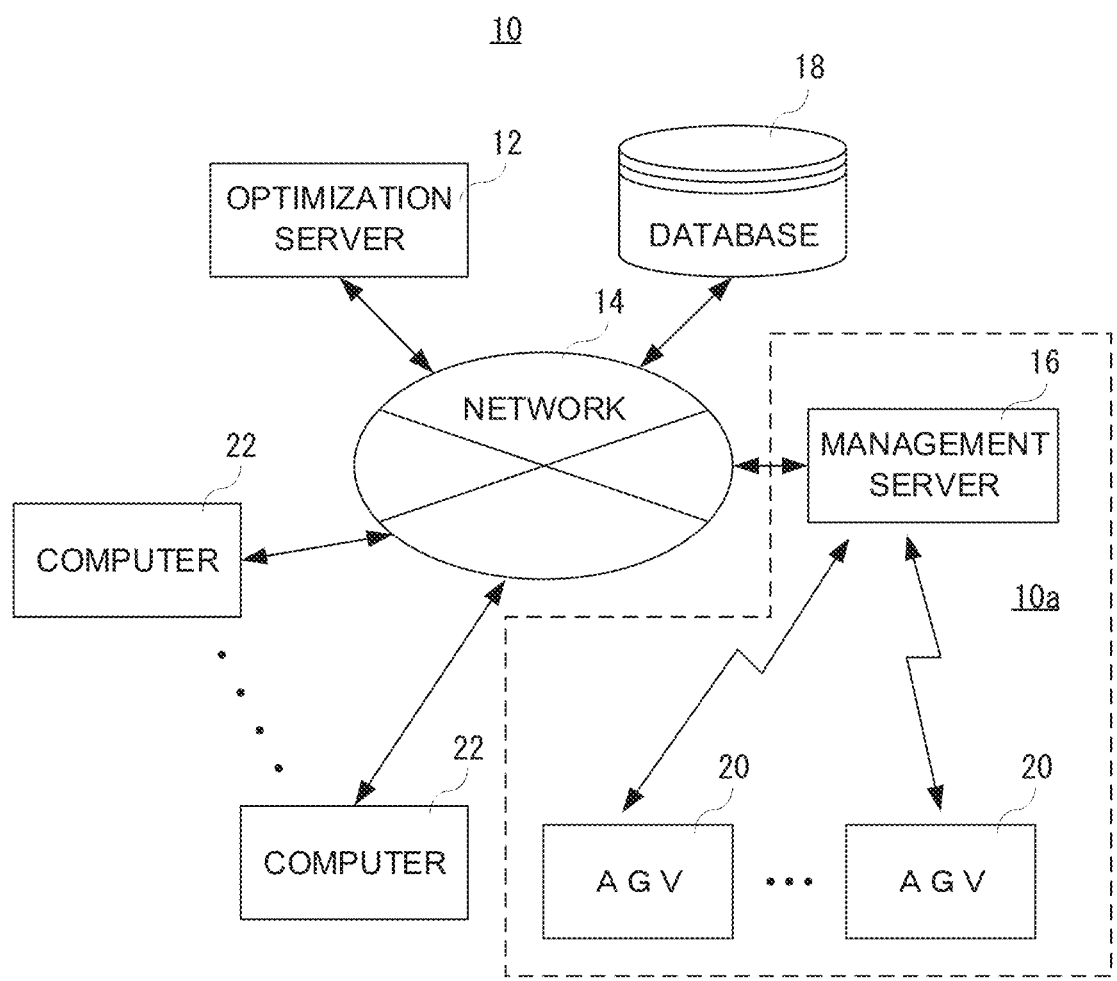
FIG. 1 is a diagram illustrating an example of a configuration of a traveling parameter optimization system according to an embodiment of the present invention.

FIG. 1 is a diagram illustrating an example of a configuration of a traveling parameter optimization system (hereinafter referred to as "optimization system") 10 according to an embodiment of the present invention. The optimization system 10 is applied to a developer or a delivery destination of an automatic traveling device (also referred to as an autonomous transport device or an unmanned transport device (hereinafter referred to as "AGV")) described below to adjust a parameter (hereinafter referred to as "traveling parameter") regarding the traveling of the AGV and to manage and control the traveling of the AGV.

The delivery destination of the AGV is a factory or a warehouse, and the AGV travels (or moves) from one site to another site at the factory or the warehouse. Here, "site" refers to the standby position of the AGV, the transport destination (including a loading/unloading position) of a cargo, and the loading position of a cargo. According to the present embodiment, the AGV moves from the standby position to the loading position of a cargo, transports the cargo from the loading position to the transport destination, and returns from the transport destination to the standby position.

As illustrated in FIG. 1, the optimization system 10 includes an optimization server 12, and the optimization server 12 is connected to a management server 16 via a network 14, such as the Internet, a WAN, or a LAN so as to communicate (transmit and/or receive). A database 18 is provided on the network 14, and the optimization server 12 and the management server 16 are each communicatively connected to the database 18.

The management server 16 is connected to each of a plurality of AGVs 20 so as to communicate wirelessly. A plurality of access points is provided at a position such as a factory or a warehouse where the AGV 20 travels autonomously or automatically, and each of the AGVs 20 communicates with the management server 16 via a different network (a network different from the network 14 described above) including the access points. According to the present embodiment, the data communicated between the management server 16 and each of the AGVs 20 includes the identification information on the AGV 20 so as to designate the AGV 20 and transmit data or specify (identify) the AGV 20 from received data.

Although the AGVs 20 are illustrated according to the present embodiment, the number of the AGVs 20 may be one.

The management server 16 is communicatively connected to a plurality of computers 22 via the network 14. The computers 22 are located at the respective sites in an area such as a factory or a warehouse where the AGVs 20 are provided. In the case of a factory, the computer 22 may be incorporated into a manufacturing device for a component provided at each site. In the case of a warehouse, a terminal owned by a person who manages a shelf may be used as the computer 22.

According to the present embodiment, the management server 16 is communicatively connected to the computers 22 via the network 14, but this does not need not be a limitation. As described above, as a different network is established at an area such as a factory or a warehouse, the management server 16 may be communicatively connected to some or all of the computers 22 via the different network.

The management server 16 and the one or more AGVs 20 constitute an automatic traveling system 10a.

Figure 2:
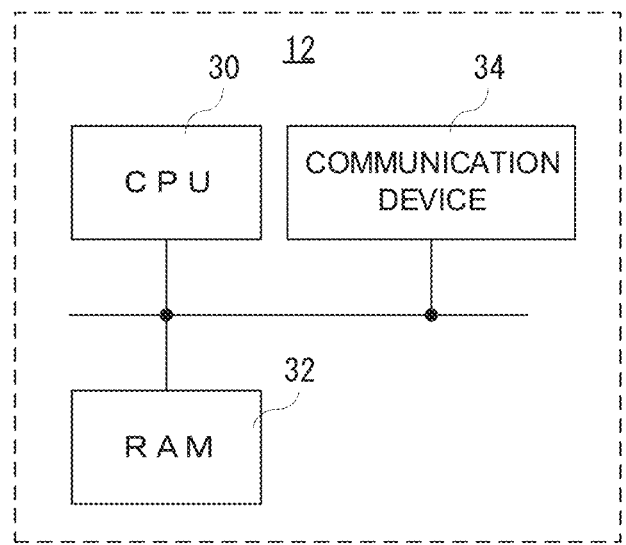
FIG. 2 is a block diagram illustrating an example of an electrical configuration of an optimization server illustrated in FIG. 1.

The optimization server 12 is a device functioning as a traveling parameter optimization device that optimizes or adjusts a traveling parameter of the AGV 20, an experimental traveling design creation device that creates an experimental traveling design for experimental traveling to optimize or adjust the traveling parameter, and an evaluation value calculation device that calculates an evaluation value based on a measurement value (experiment result described below) that is measured during the experimental traveling, and a general-purpose server may be used. FIG. 2 is a block diagram illustrating an example of an electrical configuration of the optimization server 12. As illustrated in FIG. 2, the optimization server 12 includes a CPU 30, which is coupled to a RAM 32 and a communication device 34 via an internal bus. Although not illustrated, auxiliary storage devices such as an HDD and a ROM are also provided.

The CPU 30 is a processor that performs the overall control on the optimization server 12. The RAM 32 is a primary storage device of the optimization server 12 and functions as a buffer area and a work area for the CPU 30. The communication device 34 is a communication module to communicate via a wire or wirelessly according to a communication method such as Ethernet or Wi-Fi.

When the block diagrams of the management server 16 and the AGV 20 are described below, the description of the identical circuit component are omitted.

Figure 3:
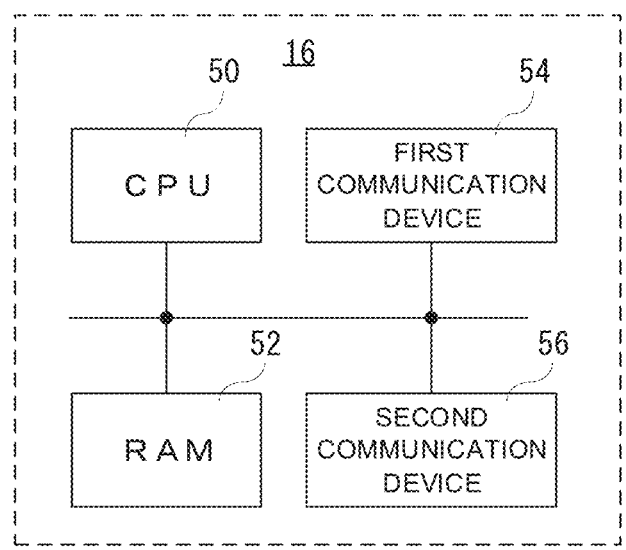
FIG. 3 is a block diagram illustrating an example of an electrical configuration of the management server illustrated in FIG. 1.

The management server 16 is a device that manages the traveling of the AGV 20, more specifically, a device functioning as a traveling instruction device that instructs or controls the traveling (or moving) of the AGV 20 and an acquisition device that acquires, from the AGV 20, a measurement value that reflects the traveling state of the AGV 20, and a general-purpose server may be used. As illustrated in FIG. 3, the management server 16 includes a CPU 50, and the CPU 50 is coupled to a RAM 52, a first communication device 54, and a second communication device 56 via an internal bus.

In the management server 16, the first communication device 54 is a communication module to communicate with the network 14 and has the same function as that of the communication device 34 described above. The second communication device 56 is a communication module to wirelessly communicate with a different device (here, the AGV 20). The second communication device 56 is a wireless communication module that is connectable to a LAN, and the communication method of this communication module is, for example, Wi-Fi or ZigBee (registered trademark).

The database 18 is a general-purpose database and, according to the present embodiment, is accessible by the optimization server 12 and the management server 16. The database 18 stores the history of the traveling parameters of the AGV 20 having undergone optimization processing and the traveling state (state data) of the AGV 20. That is, the database 18 stores the traveling parameters that have been optimized in the past. The traveling state of the AGV 20 is data about the load of the cargo transported by the AGV 20, the traveling velocity of the AGV 20, the current position of the AGV 20, the back-and-forth sway value, the swing width value, the traveling route, and the date and time of execution, associated with the identification information on the AGV 20. This is an example and does not need not be a limitation. According to the present embodiment, the above-described traveling state of the AGV 20 is stored, and the traveling parameter is optimized based on the traveling state so that the AGV 20 travels stably in various usage environments. For example, even when the load is identical, the proper traveling parameters are different for a straight traveling route and a traveling route with many corners.

According to the present embodiment, the traveling state of the AGV 20 corresponding to a first predetermined time (two seconds according to the present embodiment) is stored at an interval of the first predetermined time when the AGV 20 travels. The traveling state of the AGV 20 stored in the database 18 is the traveling state of the AGV 20 when the AGV 20 travels in an experimental laboratory, i.e., an experimental environment, and/or the traveling state of the AGV 20 when the AGV 20 travels at an area such as a factory or a warehouse, i.e., a usage environment.

Figure 4:
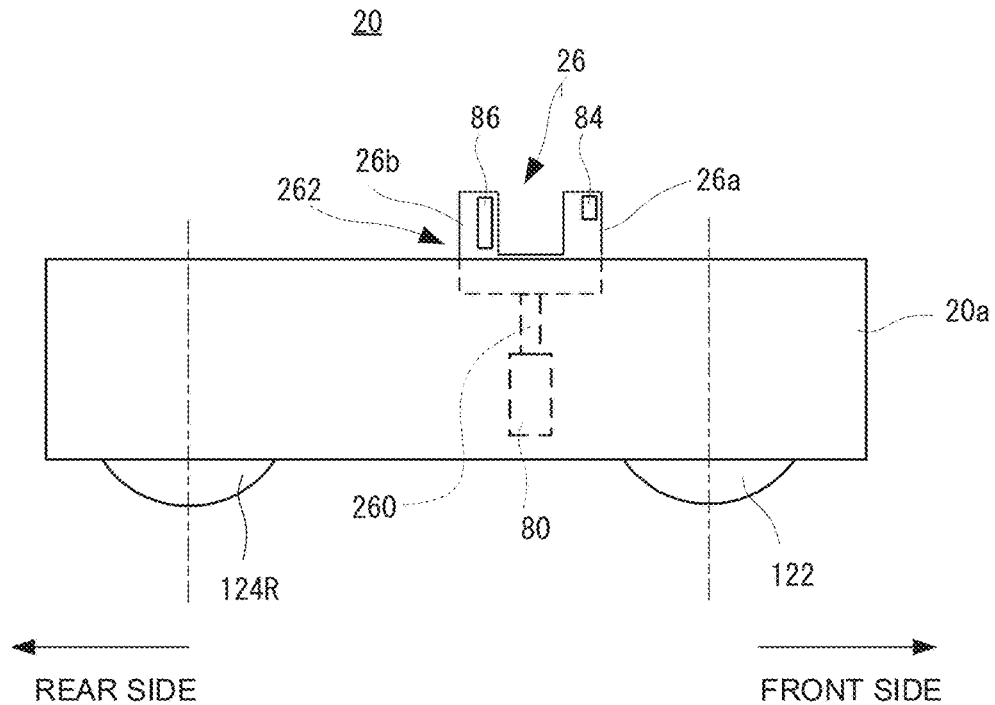
FIG. 4 is a diagram illustrating an example of a right side of an exterior configuration of an AGV illustrated in FIG. 1.
Figure 5:
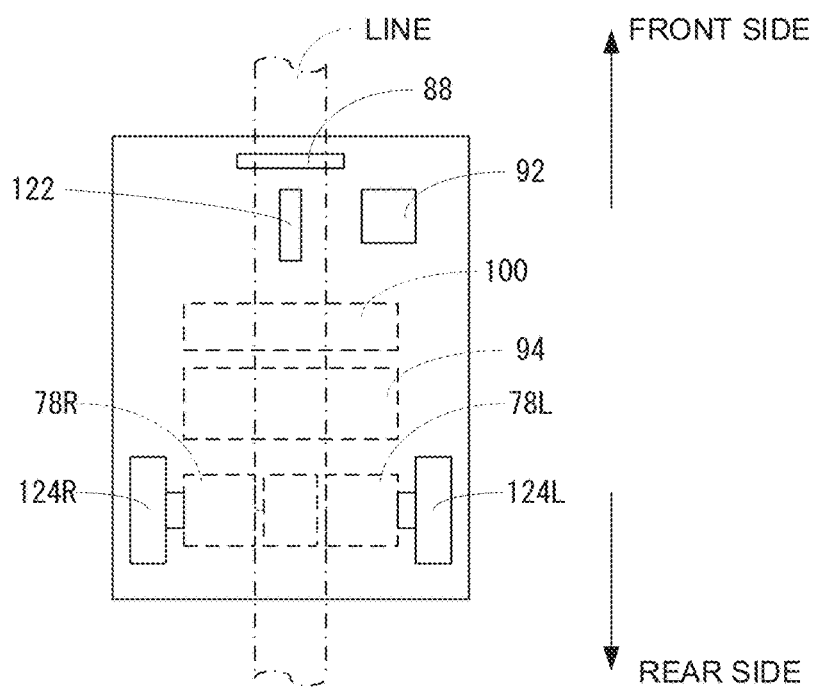
FIG. 5 is a diagram illustrating an example of a bottom side of the exterior configuration of the AGV illustrated in FIG. 1.

The AGV 20 is a robot capable of traveling autonomously and, according to the present embodiment, pulls a cart 200 that is the object to be pulled when needed. A configuration of the cart 200 is described below. FIG. 4 is a view of a right side of an exterior configuration of the AGV 20, and FIG. 5 is a view of a bottom side of the exterior configuration of the AGV 20. In FIG. 4, the right direction is the front side of the AGV 20, and the left direction is the rear side of the AGV 20. In FIG. 5, the upward direction is the front side of the AGV 20, and the downward direction is the rear side of the AGV 20.

The AGV 20 includes a vehicle main body 20a having the shape like a cuboid with a short height so as to slide between the floor or the ground and a lower surface of the cart 200, and a pair of right and left pulling arms 26 is provided in an upper portion of the vehicle main body 20a to be liftable and lowerable so as to pull the cart 200. Although a detailed description is omitted, the pulling arm 26 includes a hydraulic cylinder 260 and a connection portion 262 connecting the cart 200, and the hydraulic cylinder 260 is lifted and lowered by a hydraulic drive device 80 so that the connection portion 262 is also lifted and lowered. The connection portion 262 has a recessed end when the cart 200 (or the pulling arm 26) is viewed from the side.

As the cart 200 to be used is previously determined, the distance by which the pulling arm 26 is lifted or lowered is previously determined. Depending on the distance, the number of rotations of a drive motor that drives a hydraulic pump built in the hydraulic drive device 80 is also determined. Although not illustrated, the hydraulic drive device 80 includes the hydraulic pump and the drive motor that drives the hydraulic pump.

FIG. 4 (and also FIGS. 8 and 9 described below) illustrates a state where the pulling arm 26 has been lifted.

The connection portion 262 of the pulling arm 26 includes a first portion 26a on the front side and a second portion 26b on the rear side, a proximity sensor 84 is provided in an upper portion of the first portion 26a, and a load sensor 86 is provided on a side surface of the second portion 26b on the front side.

The proximity sensor 84 is, for example, a transmissive or reflective optical sensor to detect the lower surface of the cart 200 when the cart 200 is connected to the AGV 20. When the AGV 20 slides under the cart 200 (or a base 202) and the proximity sensor 84 detects the rear edge of the lower surface of the cart 200, the AGV 20 proceeds from that position to a connection position provided further forward by a predetermined distance and then stops.

Figure 9:
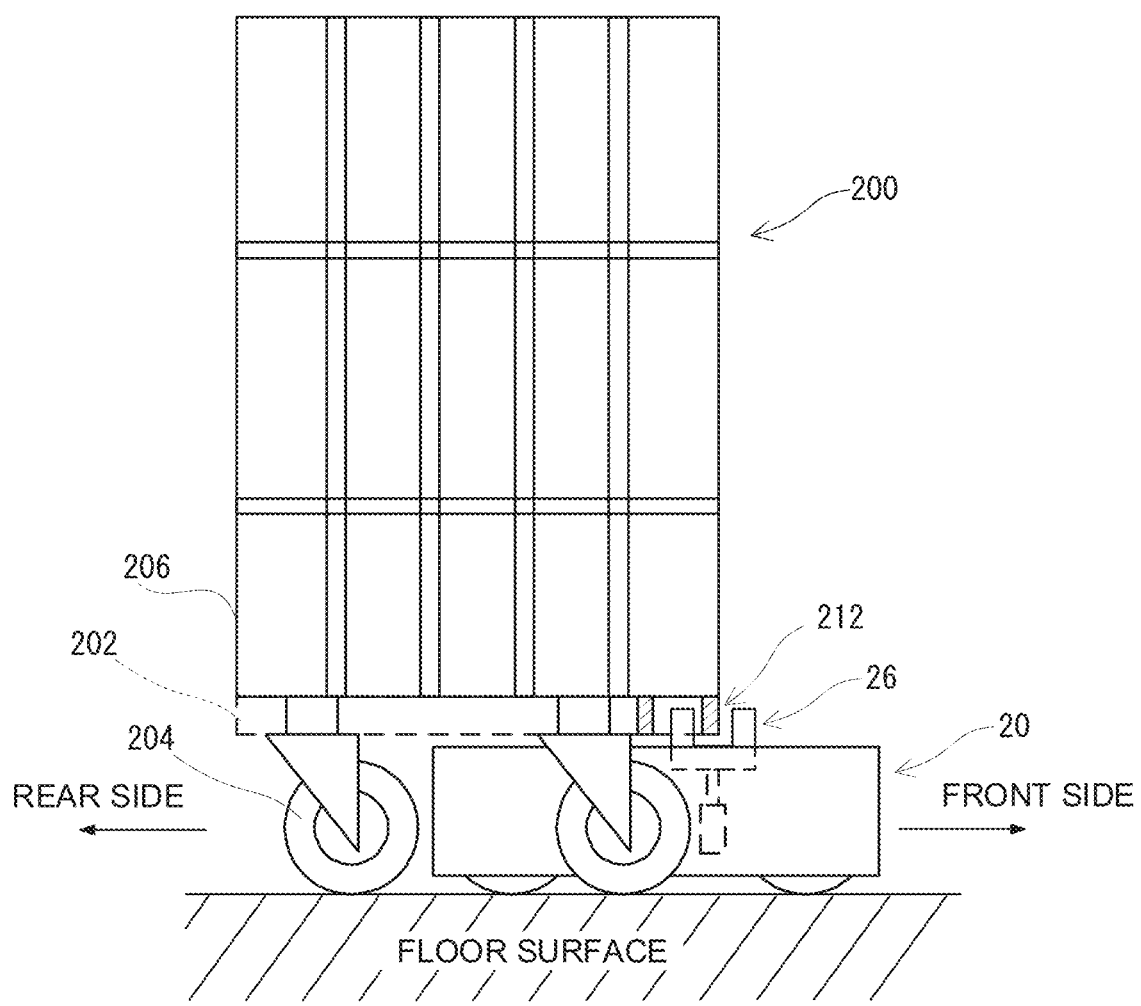
FIG. 9 is a diagram illustrating an example of a connection state between the AGV and the cart when the AGV pulls the cart.
Figure 10:
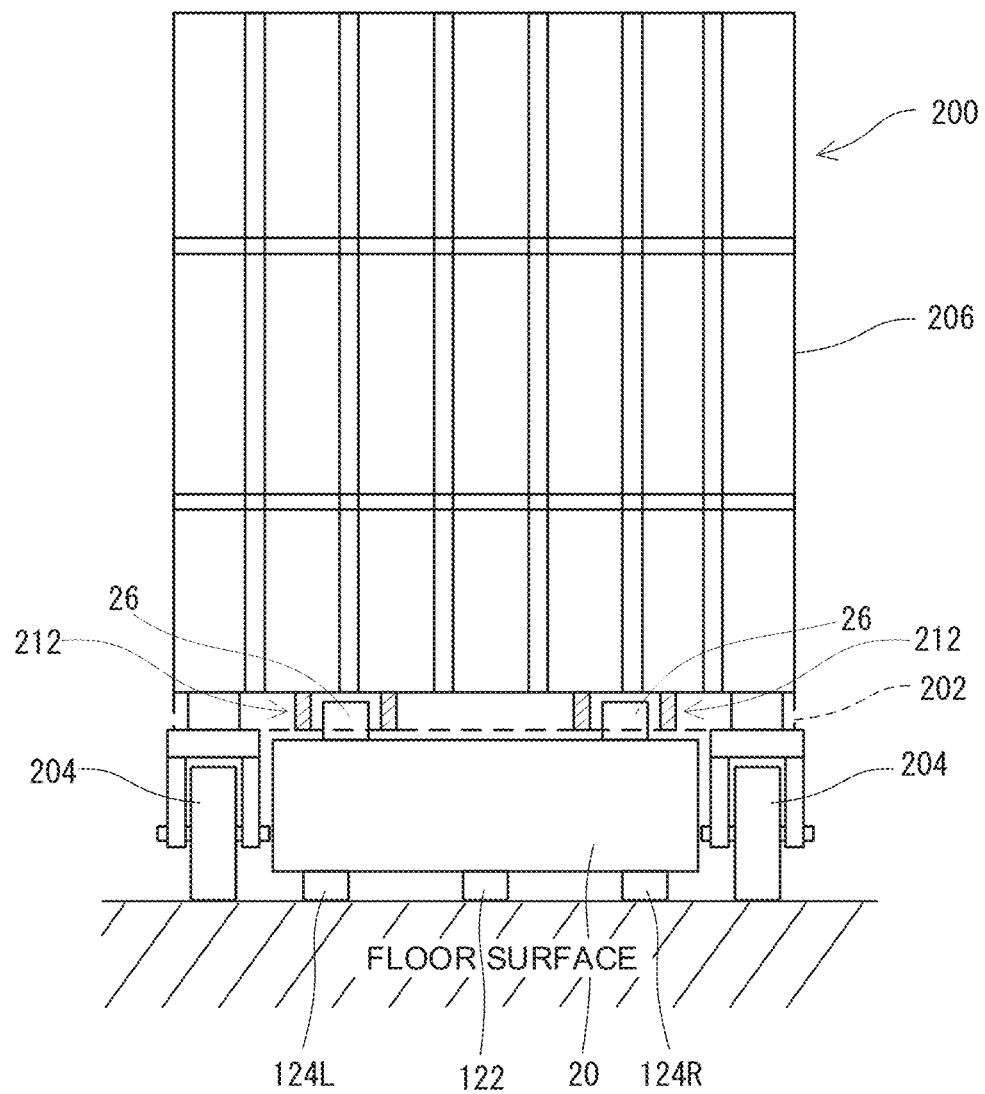
FIG. 10 is another diagram illustrating an example of the connection state between the AGV and the cart when the AGV pulls the cart.

A connection portion 212 which the pulling arm 26 is connected to (or engaged with) is provided on a lower surface of the base 202 (see FIGS. 9 and 10). Accordingly, when the pulling arm 26 is lifted after the AGV 20 is stopped, a plate member 212a forming the connection portion 212 is disposed between the first portion 26a and the second portion 26b of the pulling arm 26 (the connection portion 262), and the plate member 212a is engaged with the second portion 26b when the AGV 20 moves, so the AGV 20 pulls the cart 200.

The load sensor 86 is a general-purpose load sensor to detect the load applied to the AGV 20 (or the pulling arm 26) when the cart 200 is pulled. The load is the load of the cargo including the cart 200. In this description, the load of the cart 200 and the cargo carried on the cart 200 are hereinafter simply referred to as "the load of the cargo".

As illustrated in FIG. 5, the AGV 20 includes three wheels on the lower surface of the vehicle main body 20a. According to the present embodiment, one front wheel 122 and right and left rear wheels 124L and 124R are provided. The one front wheel 122 is an auxiliary wheel that is provided so as to rotate with respect to the vehicle main body 20a. The right and left rear wheels 124L and 124R are drive wheels that are provided fixedly with respect to the vehicle main body 20a.

Therefore, the moving direction of the AGV 20 may be changed by varying the rotation velocities of the right and left rear wheels 124L and 124R. For example, when the rotation of the left rear wheel 124L is stopped (the rotation velocity is set to 0) and the right rear wheel 124R is rotated (the rotation velocity is set to more than 0), the AGV 20 is turned left. When the rotation of the right rear wheel 124R is stopped (the rotation velocity is set to 0) and the left rear wheel 124L is rotated (the rotation velocity is set to more than 0), the AGV 20 is turned right.

A left wheel motor 78L and a right wheel motor 78R are provided inside the vehicle main body 20a. The left wheel motor 78L is connected to the left rear wheel 124L, and the right wheel motor 78R is connected to the right rear wheel 124R. The wheel motors 78L and 78R are connected to a wheel drive circuit 76.

The vehicle main body 20*a* further includes a battery 94 and a control board 100. The control board 100 incorporates circuit components such as a CPU 70, a RAM 72, a communication device 74, and an inertial sensor 90, which are described below.

A line sensor 88 and an RF tag reader 92 are provided on the lower surface of the vehicle main body 20*a*. According to the present embodiment, the line sensor 88 is located at the front end of the AGV 20 and at the center in the right-left direction. According to the present embodiment, the RF tag reader 92 is located on the front side with respect to the center in the front-back direction of the AGV 20 and on the left side with respect to the center in the right-left direction. The installation positions of the line sensor 88 and the RF tag reader 92 are examples and do not need not be limited.

Figure 6:
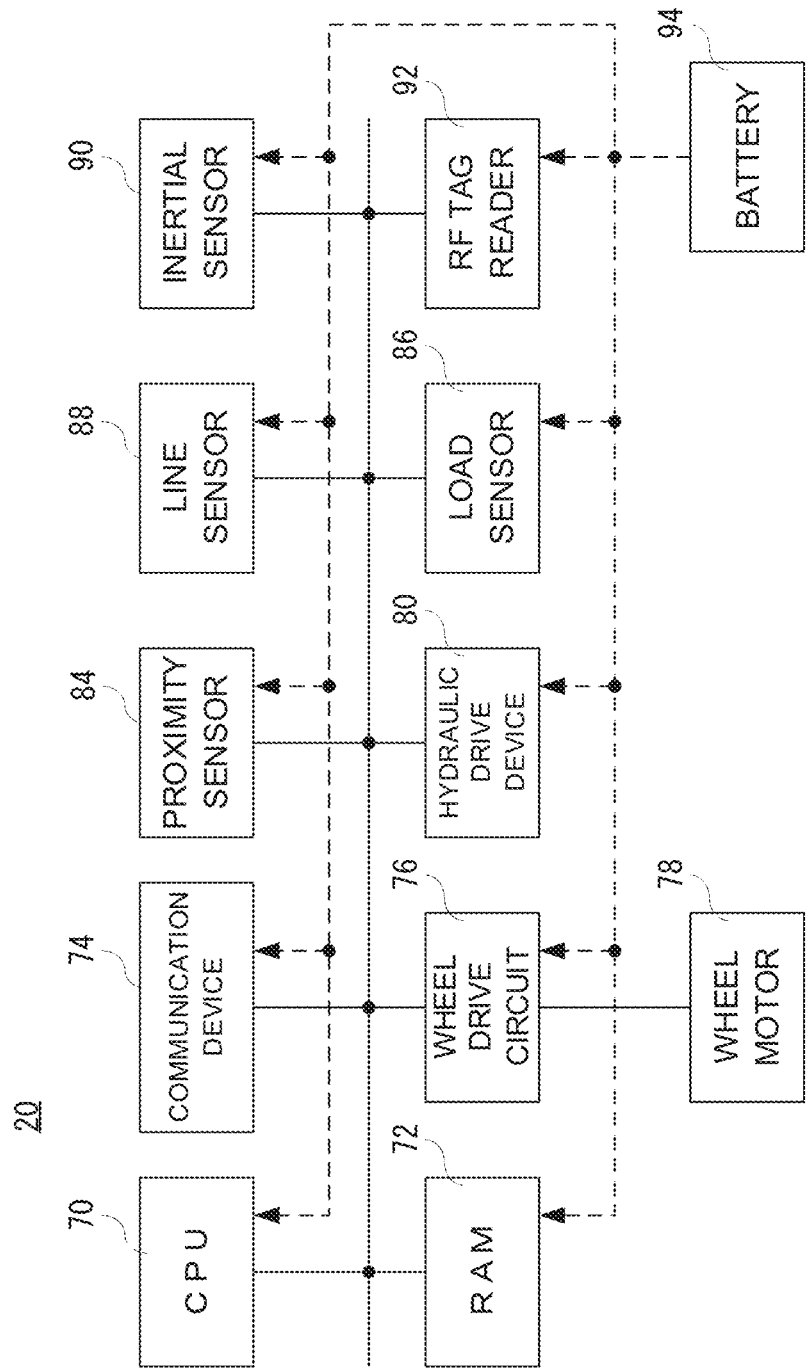
FIG. 6 is a block diagram illustrating an example of an electrical configuration of the AGV illustrated in FIG. 1.

FIG. 6 is a block diagram illustrating an example of an electrical configuration of the AGV 20 illustrated in FIG. 1. As illustrated in FIG. 6, the AGV 20 includes the CPU 70, and the CPU 70 is connected via a bus to the RAM 72, the communication device 74, the wheel drive circuit 76, the hydraulic drive device 80, the proximity sensor 84, the load sensor 86, the line sensor 88, the inertial sensor 90, and the RF tag reader 92. The wheel drive circuit 76 is connected to a wheel motor 78. The above-described battery 94 is connected to each component of the AGV 20.

The CPU 70 and the RAM 72 are as described above. Although not illustrated, the AGV 20 also includes a memory such as an HDD and a ROM other than the RAM 72. The RAM 72 stores data on the map of an experimental environment or a usage environment where the AGV 20 travels and a traveling route.

The communication device 74 is a communication module to wirelessly communicate with another device (here, the management server 16). For example, the communication device 74 is a communication module of the same communication method (e.g., Wi-Fi or ZigBee (registered trademark)) as that of the second communication device 56 of the management server 16.

The wheel drive circuit 76 is a drive circuit that, in response to an instruction of the CPU 50, generates a drive voltage for the wheel motor 78 and applies the generated drive voltage to the wheel motor 78. The wheel motor 78 is a motor that rotates the wheels of the AGV 20. Although not illustrated in FIG. 6, as described above, the wheel motor 78 includes the left wheel motor 78L that drives the left rear wheel 124L and the right wheel motor 78R that drives the right rear wheel 124R out of the two rear wheels (124L and 124R) provided in the AGV 20. The wheel motor 78L and the wheel motor 78R are driven individually by the wheel drive circuit 76 so that the AGV 20 goes straight, turns left, turns right, accelerates, decelerates, and stops. Although not illustrated, each of the wheel motor 78L and the wheel motor 78R includes an encoder, and the respective numbers of rotations are detected by the encoders and notified to the CPU 50. Although not illustrated, the left rear wheel 124L is directly connected to a rotation shaft of the wheel motor 78L, and the right rear wheel 124R is directly connected to a rotation shaft of the wheel motor 78R. Thus, the CPU 50 detects the numbers of rotations of the wheel motor 78L and the wheel motor 78R so as to determine the numbers of rotations of the rear wheel 124L and the rear wheel 124R.

The hydraulic drive device 80 includes a drive circuit that, in response to an instruction of the CPU 50, generates a drive voltage for the drive motor and applies the generated drive voltage to the drive motor, and the drive motor drives the hydraulic pump to lift and lower the hydraulic cylinder 260 of the pulling arm 26.

The proximity sensor 84 is a transmissive or reflective optical sensor as described above according to the present embodiment. The load sensor 86 is a general-purpose load sensor as described above according to the present embodiment.

The line sensor 88 is a magnetic sensor having a plurality of (eight according to the present embodiment) sensing elements 88*a*, 88*b*, 88*c*, 88*d*, 88*e*, 88*f*, 88*g*, and 88*h* arranged in a horizontal row to detect a movement line (also referred to as guide line or guide) provided (or attached) on a floor surface at a factory or a warehouse. According to the present embodiment, the sensing elements 88*a* to 88*h* are Hall elements, and the interval between the adjacent sensing elements 88*a* to 88*h* is set to a predetermined distance. The line is formed of a magnetic tape and is provided on a course along which the AGV 20 may move (or travel) with a predetermined width. Accordingly, the AGV 20 moves along the line as described below.

The inertial sensor 90 is an acceleration sensor to detect the acceleration rate of the AGV 20. According to the present embodiment, the inertial sensor 90 is used to detect the number of times the AGV 20 suddenly accelerates and suddenly decelerates. Therefore, a single-axis acceleration sensor capable of detecting the acceleration rate of the AGV 20 in the front-back direction may be used as an acceleration sensor. The average value of the acceleration rate detected by the acceleration sensor during the first predetermined time (two seconds according to the present embodiment) is integrated with respect to the first predetermined time so that the traveling velocity of the AGV 20 may be determined. The management server 16 may calculate the traveling velocity of the AGV 20.

The RF tag reader 92 reads the tag information of an RFID tag provided (or attached) on the floor surface at the warehouse. According to the present embodiment, the RFID tag is provided near the line and at the position where the AGV 20 is to perform a predetermined operation that is different from the normal movement. For example, the position where a predetermined operation is to be performed corresponds to the position of the site, the position where a turn operation (left turn or right turn) is to be performed, and the position where the traveling velocity (acceleration or deceleration) is to be changed. The position of the site is the stop position of the AGV 20.

Accordingly, the AGV 20 reads the tag information of the RFID tag by the RF tag reader 92 and interacts with the management server 16 based on the read tag information. The management server 16 determines the position (i.e., the current position) of each of the AGVs 20, transmits a traveling instruction to each of the AGVs 20, and transmits an instruction for a predetermined operation (stop, left turn, right turn, and velocity change (i.e., acceleration and deceleration)) at a predetermined position to each of the AGVs 20.

Each of the AGVs 20 determines its own traveling route and may determine the number of rotations of the wheel motor 78. Therefore, in an area where the tag information is not readable, each of the AGVs 20 calculates the distance traveled based on the number of rotations of the wheel motor 78 after reading the tag information and refers to the data on the map so as to determine its current position.

The battery 94 is a rechargeable secondary battery and, for example, a lithium-ion battery may be used. The battery 94 supplies an electric power to each circuit component of the AGV 20. In FIG. 6, electric wires are illustrated in dashed lines to be distinguished from signal wires.

In the optimization system 10 having the above-described configuration, the management server 16 designates the traveling route and controls the traveling of the AGV 20 using the prepared traveling parameter. The AGV 20 moves without any load or with the cart 200 pulled thereby at an area such as a factory or a warehouse where it is installed.

Figure 7:
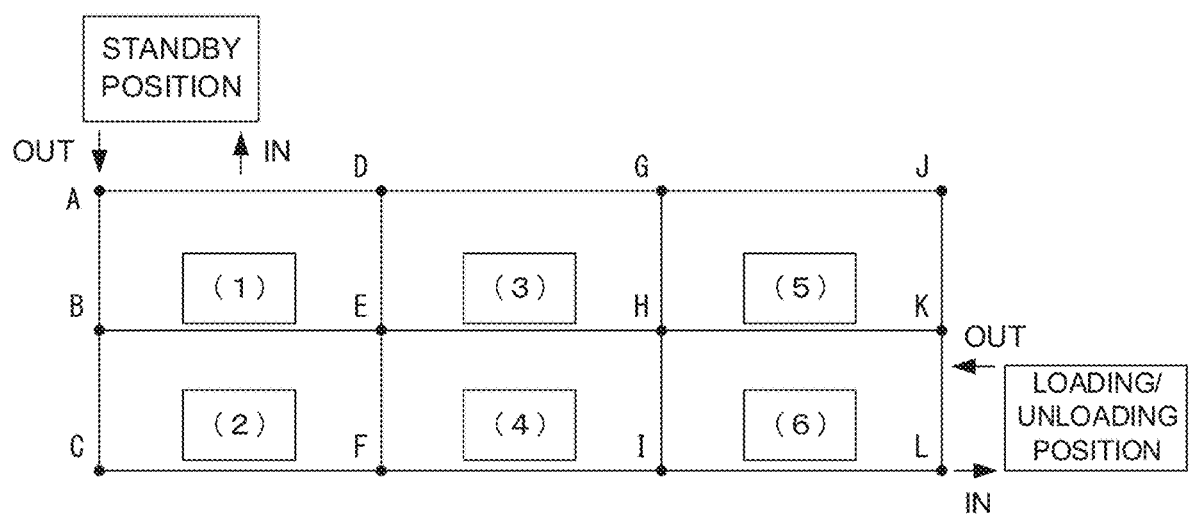
FIG. 7 is a diagram schematically illustrating an example of a usage environment of the AGV.

FIG. 7 illustrates an example of the position where the AGV 20 is located and traveled. In FIG. 7, the standby position is the location or region where the one or more AGVs 20 stand by without transporting any cargo. The loading/unloading position is a position to collect cargoes so as to deliver (or ship) the cargoes to another position. The solid line described in a matrix is a line provided in the position where the AGV 20 is located and traveled. As described above, the AGV 20 travels along the line, and therefore the solid line described in a matrix may be referred to as a course along which the AGV 20 travels. Points A, B, C, D, E, F, G, H, I, J, K, and L described on the line are corners or intersections. A rectangular frame with a bracketed number represents a device or a shelf located in an area such as a factory or a warehouse.

When a person who manages the device or the shelf makes a request (hereinafter referred to as "transport request") for transporting a cargo, the management server 16 controls the available AGV 20 so as to transport the cargo. The person who manages the device or the shelf designates the transport destination and makes a transport request. The device may automatically issue a transport request. The person who manages the shelf makes a transport request using a terminal (corresponds to the computer 22) owned by himself/herself. The transport request may be input to the management server 16 by the administrator of the management server 16.

When there is a transport request, the management server 16 determines a traveling route for the AGV 20. Although a detailed description is omitted, the management server 16 selects, from multiple previously set traveling routes, a traveling route that is the shortest distance and that does not affect the traveling of the other AGVs 20.

The management server 16 stores the data on the map about the area as illustrated in FIG. 7 and selects the shortest traveling route between two sites, i.e., between the current position (the standby position, the loading position, or the transport destination according to the present embodiment) of the AGV 20 and the traveling destination or the target position (the loading position, the transport destination, or the standby position according to the present embodiment) in consideration of the current positions and the traveling destinations of the other AGVs 20. The traveling route may be previously determined in accordance with the two sites.

The traveling route determined by the management server 16 is information in which the start point and the end point of the traveling route and a plurality of points (any two or more points out of the points A to L) corresponding to the positions where the AGV 20 passes or changes its direction when moving along the traveling route are arranged in chronological order.

For example, when the administrator who manages a device or shelf (3) makes a transport request designating a device or shelf (6), the management server 16 determines the traveling route from the standby position to the device or shelf (3). For example, the information in which the identification information on the standby position, the point A, the point B, the point E, and the position of the device or shelf (3) are arranged in chronological order is determined as a traveling route. Then, the management server 16 transmits the traveling instruction including the determined traveling route and the traveling parameter from the standby position to the device or shelf (3) to the available AGV 20. That is, according to the present embodiment, the traveling instruction includes the identification information on the AGV 20, the traveling route, and the information (corresponding to "traveling parameter designation information") for designating the traveling parameter.

When the AGV 20 moves from the standby position to the device or shelf (3) along the traveling route, the cargo is loaded. While the AGV 20 is traveling, the management server 16 transmits an operation instruction for performing a predetermined operation in accordance with the current position of the AGV 20. Furthermore, the same applies while the AGV 20 is traveling. According to the present embodiment, "loading" means that the AGV 20 connects the cart 200 with the cargo loaded thereon to the pulling arm 26. The AGV 20 notifies the management server 16 that the cargo has been loaded. The administrator of the device or the shelf may notify the management server 16 that the cargo has been loaded.

As described above, the AGV 20 stores, in the RAM 72, the data on the map about the area such as a factory or a warehouse where the AGV 20 is located, and the map includes information on the above-described course, the positions of a turn and an intersection, the standby position, and the loading/unloading position. Therefore, in response to the received traveling instruction from the management server 16, the AGV 20 travels along the traveling route included in the traveling instruction while referring to the data on the map stored in the RAM 72. Here, the driving of the wheel motor 78 is controlled based on the traveling parameter included in the traveling instruction.

The AGV 20 transmits (or notifies) its own traveling state (the traveling state of the AGV 20) to the management server 16 at an interval of the first predetermined time while traveling, and the management server 16 receives (or acquires) the traveling state of the AGV 20 and, in each case or once in some cases, transmits the traveling state of the AGV 20 to the database 18.

Accordingly, the management server 16 may determine the load of the cargo (including the cart 200) that is being transported by the AGV 20. The management server 16 may determine the current position of the AGV 20 and the traveling velocity of the AGV 20 at an interval of the first predetermined time.

In response to the received notification that the cargo has been loaded, the management server 16 determines the traveling route from the device or shelf (3) to the device or shelf (6). For example, the information in which the identification information on the position of the device or shelf (3), the point H, the point I, and the position of the device or shelf (6) are arranged in chronological order is determined as a traveling route. Then, the management server 16 transmits, to the AGV 20 from which the notification of cargo loading has been received, the control signal including the determined traveling route and the traveling parameter from the device or shelf (3) to the device or shelf (6).

After the AGV 20 moves from the device or shelf (3) to the device or shelf (6) along the traveling route, the cargo is unloaded at the position of the device or shelf (6). According to the present embodiment, the AGV 20 disconnects the connection state between the cart 200 having the cargo loaded thereon and the pulling arm 26. The AGV 20 notifies the management server 16 that the cargo has been unloaded.

The administrator of the device or the shelf may notify the management server 16 that the cargo has been unloaded.

In response to the received notification that the cargo has been unloaded, the management server 16 determines the traveling route from the device or shelf (6) to the standby position. For example, the information in which the identification information on the position of the device or shelf (6), the point L, the point K, the point J, the point G, the point D, and the standby position are arranged in chronological order is determined as a traveling route. Then, the management server 16 transmits, to the AGV 20 from which the notification of cargo unloading has been received, the traveling instruction including the determined traveling route and the traveling parameter from the device or shelf (6) to the standby position.

Accordingly, the AGV 20 moves from the device or shelf (6) to the standby position along the traveling route. That is, the AGV 20 having transported the cargo returns to the standby position.

This is an example, and the AGV 20 having transported the cargo from one site to another site may transport a cargo from another site to further another site. The transport destination of the cargo may be a loading/unloading position.

Figure 8:
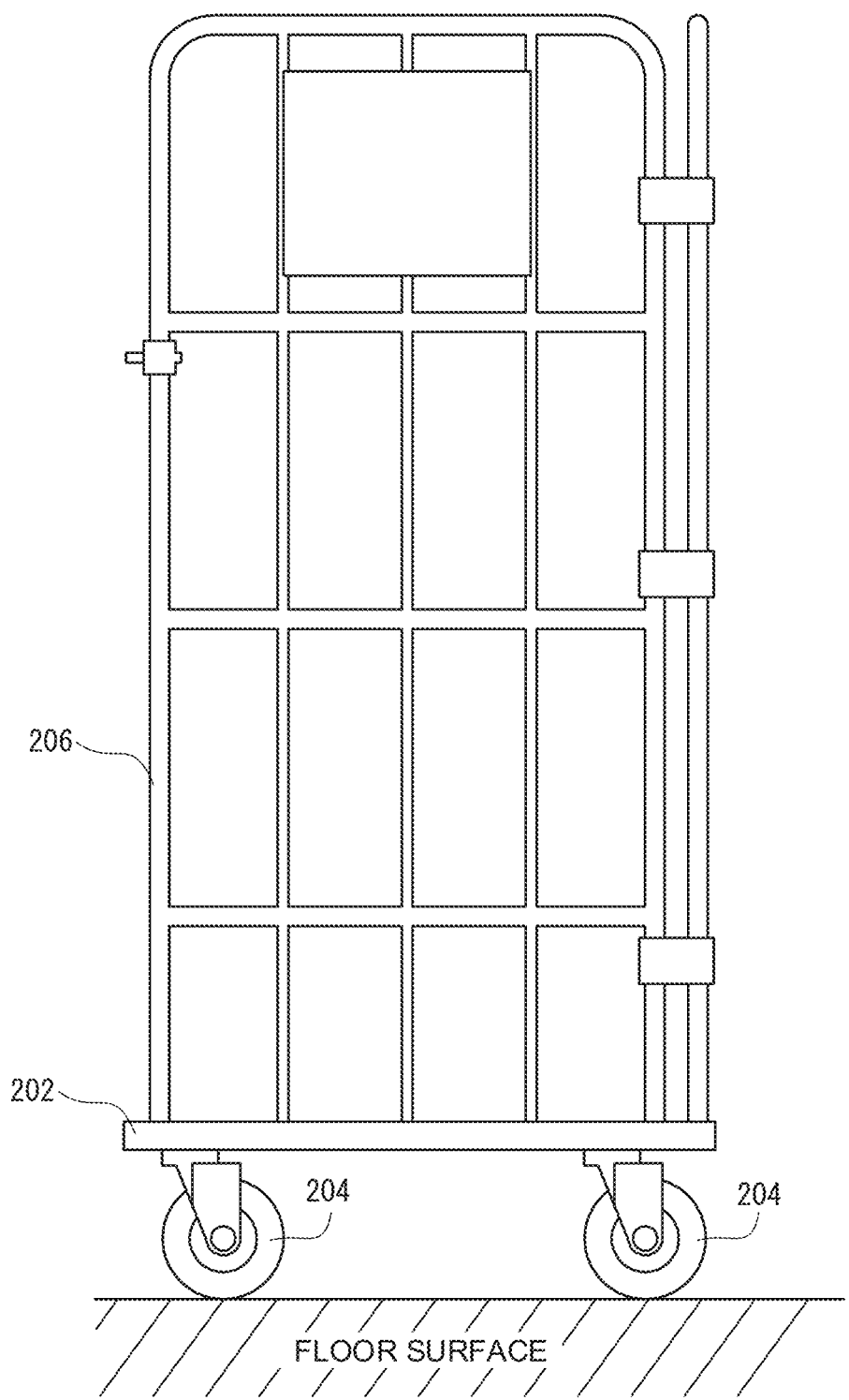
FIG. 8 is a diagram illustrating an example of an exterior configuration of a cart pulled by the AGV.

The cart 200 according to the present embodiment is described here. As illustrated in FIG. 8, the cart 200 according to the present embodiment is a roll box cart, also called a roll box pallet or a cage cart. The cart 200 includes the base 202, and casters 204, which are swivel wheels, are provided on the respective four corners of the lower surface of the base 202. A cage 206 is provided on the upper surface of the base 202.

FIG. 9 is a view of the AGV 20 connected to the cart 200 so as to be pulled when viewed from the right side, and FIG. 10 is a view of the AGV 20 connected to the cart 200 so as to be pulled when viewed from the rear side. In FIGS. 9 and 10, the base 202 is illustrated in a chain line in order to illustrate the pulling arm 26 and the connection portion 212 in a transparent state. Also, in FIGS. 9 and 10, the connection portion 212 is illustrated in cross-section in order to illustrate the connection state between the pulling arm 26 and the connection portion 212. Further, in FIGS. 9 and 10, part of the upper portion of the cage 206 is omitted.

As illustrated in FIGS. 9 and 10, the pair of right and left connection portions 212 for connecting the pulling arms 26 is provided at the front end of the lower surface of the base 202 of the cart 200. The connection portion 212 is formed in a cylindrical shape having a square shape in cross-section and has a free opening at the lower end. Therefore, as described above, when the pulling arm 26 of the AGV 20 is lifted, the second portion 26b enters the inside of the connection portion 212 through the opening. Thus, when the AGV 20 moves, the pulling arm 26 engages with the connection portion 212, and the cart 200 follows the AGV 20 so as to move. As the connection portion 212 is formed in a cylindrical shape, the pulling arm 26 is not detached from the connection portion 212 even when the cart 200 travels in zigzags.

As described above, the AGV 20 moves along the line. When the cart 200 pulled by the AGV 20 is loaded with a cargo, the mass of the cart 200 may be greater than that of the AGV 20. For example, the mass of the cart 200 loaded with a cargo may be about two to four times the mass of the AGV 20. In this case, the cart 200 has a large inertia force corresponding to the mass of the cart 200 and, when there is a sudden change in the traveling direction, the inertia force of the cart 200, in combination with a low straight-running stability of the cart 200, may cause the AGV 20 to deviate from the direction in which the AGV 20 is supposed to travel. In such a case, once the cart 200 starts to travel in zigzags, the swing width gradually increases, zigzag traveling does not settle, the AGV 20, which has a mass lower than that of the cart 200, cannot control the traveling of the cart 200, and in extreme cases, the AGV 20 may deviate completely from the traveling route.

All the wheels of the cart 200 are the casters 204 that are swivel wheels in consideration of maneuverability for fixed turn (i.e., spin turn), or the like, in a narrow space. For this reason, the straight-running stability is low as described above.

Therefore, the AGV 20 according to the present embodiment performs the process to calculate the rotation direction and the rotation velocity of the right and left drive wheels, i.e., the rear wheels 124L and 124R, so as to correct a positional shift of the AGV 20 with respect to the line by using a known method for feedback control using PID control during automatic traveling.

A positional shift of the AGV 20 with respect to the line is detected based on the output of the line sensor 88. As described above, the line sensor 88 has a configuration such that the sensing elements 88a to 88h are arranged in a horizontal line. The direction perpendicular to the traveling direction of the AGV 20 is the direction (i.e., the horizontal (right-left) direction) in which the sensing elements 88a to 88h are arranged.

Figure 11:
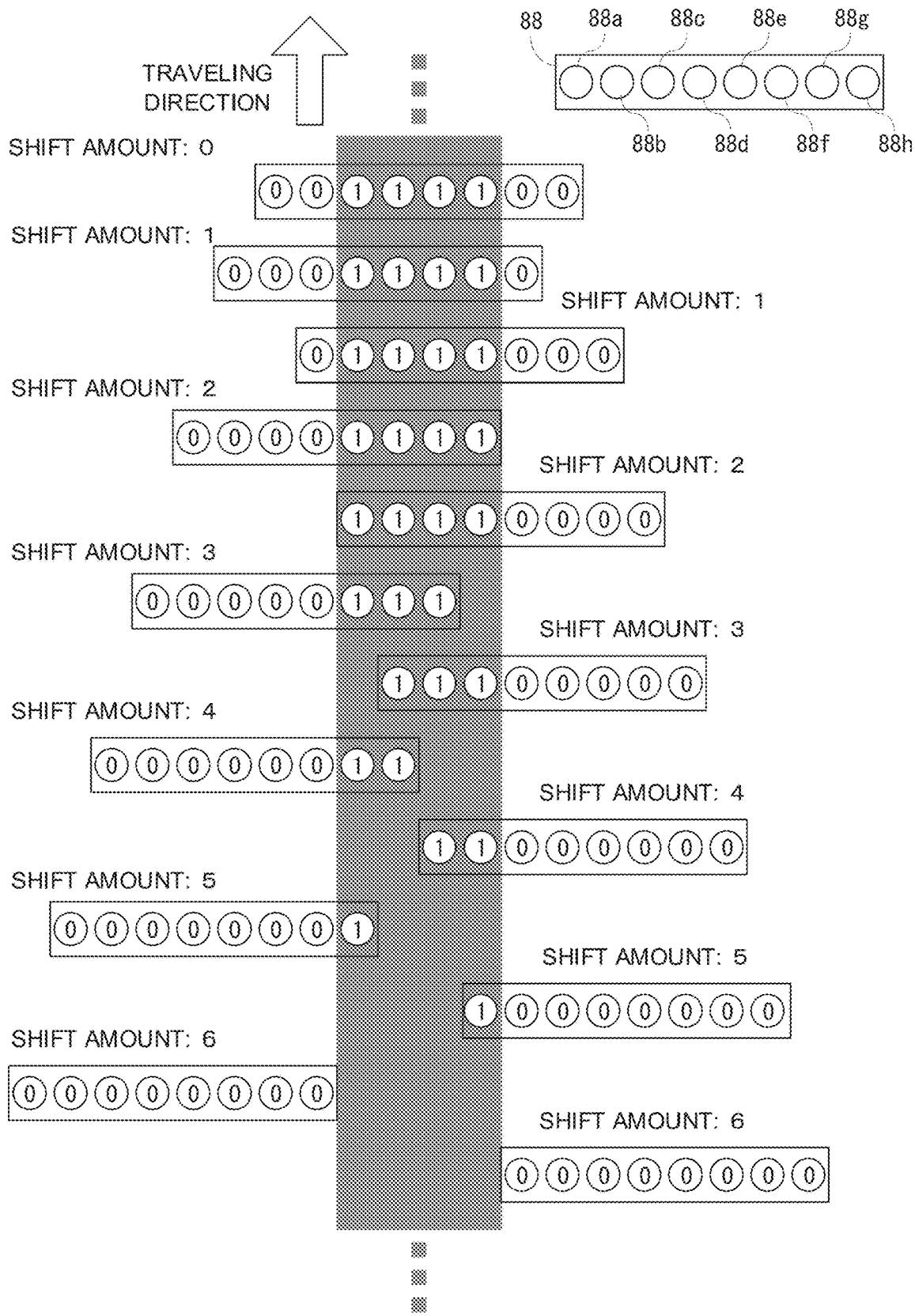
FIG. 11 is a diagram illustrating a right-left shift amount of the AGV detected by a line sensor with respect to a traveling direction.

FIG. 11 is a diagram illustrating a positional shift of the AGV 20 with respect to the line. The upper right of FIG. 11 illustrates the arrangement of the sensing elements 88a to 88h in the line sensor 88. In the example illustrated in FIG. 11, the AGV 20 is omitted and only the line sensor 88 is illustrated. Furthermore, in the example illustrated in FIG. 11, the upper side of FIG. 11 is the traveling direction of the AGV 20 and, in the following description, the left direction and the right direction are described based on the traveling direction. Moreover, in the example illustrated in FIG. 11, the sensing elements 88a to 88f detecting the line are marked with "1", and the sensing elements 88a to 88f not detecting the line are marked with "0". In FIG. 11, the line is illustrated in gray.

When the center of the width of the line matches the center of the width of the line sensor 88, the position of the center (hereinafter referred to as "center position") of the width of the AGV 20 matches the position of the center (hereinafter referred to as "reference position") of the width of the line. In this case, the AGV 20 is traveling straight along the line. At this point, the shift amount between the center position and the reference position is 0 and, as illustrated in FIG. 11, the sensing elements 88c to 88f are detecting the line, while the sensing elements 88a, 88b, 88g, and 88h are not detecting the line.

In a case where the shift amount in the left direction is 1, the sensing elements 88d to 88g are detecting the line, while the sensing elements 88a to 88c and 88h are not detecting the line. In a case where the shift amount in the right direction is 1, the sensing elements 88b to 88e are detecting the line, while the sensing elements 88a and 88f to 88h are not detecting the line.

Although not described, the illustrations are also given for the cases where the shift amount is 2 to 6 in each of the left direction and the right direction.

In the illustration of FIG. 11, the AGV 20 deviates with respect to the line to right and left in a parallel manner; however, as described above, as the AGV 20 travels in zigzags, the traveling direction of the AGV 20 is actually tilted with respect to the line in the left direction or the right direction, the line sensor 88 is also tilted accordingly, and the sensing elements 88a to 88h detecting the line are changed.

According to the present embodiment, the PID control is used as a method for feedback control; however, PI control, P control, on-off control, or PD control may also be used according to other embodiments.

Here, the PID control is a control method for feedback by, based on the shift amount (deviation) of the output with respect to the target value, combining three elements, i.e., proportion (P), integral (I), and differential (D), of the deviation at an appropriate rate. According to the present embodiment, the ratio of the feedback amount of a proportional element of the deviation, the feedback amount of an integral element, and the feedback amount of a differential element is selected as appropriate so that the AGV 20 travels along the line.

When the traveling parameter for the steering control using the PID control is not appropriate, the cart 200 largely travels in zigzags. In such a case, even though the PID control is performed, the AGV 20 may deviate from the line instead of traveling along the line. When the traveling parameter for acceleration control using the PID control is not appropriate, the AGV 20 may accelerate rapidly or decelerate rapidly in the traveling direction.

Therefore, according to the present embodiment, an appropriate traveling parameter is calculated in accordance with the traveling state of the AGV 20, and the movement of the AGV 20 is controlled by using the traveling parameter, so that it is possible to prevent the cart 200 from largely traveling in zigzags or rapidly accelerating or decelerating and to ensure that the AGV 20 moves smoothly along the line by the PID control.

Next, the traveling parameter of the AGV 20, the optimization processing for the traveling parameter, and the traveling control of the AGV 20 using the optimized traveling parameter are described respectively.

FIG. 12 is a table illustrating examples of the traveling parameters of the AGV 20. As illustrated in FIG. 12, the traveling parameters include sets of multiple types of parameters (each parameter may hereinafter be referred to as "individual parameter") for performing different controls on the traveling of the AGV 20, and the minimum value, the maximum value, and the representative value are described corresponding to each individual parameter. The individual parameters illustrated in FIG. 12 are a part of the traveling parameters, and many other individual parameters may be provided. The individual parameters illustrated in FIG. 12 are broadly classified into PID traveling control parameters for performing feedback control using the PID control on the traveling of the AGV 20 and other basic traveling parameters.

The PID traveling parameters include the respective individual parameters for P gain adjustment (steering P value), I gain adjustment (steering I value), and D gain adjustment (steering D value), which are PID traveling control parameters for a track shift amount, and the respective individual parameters for P gain adjustment (velocity P value), I gain adjustment (velocity I value), and D gain adjustment (velocity D value), which are PID traveling control parameters for the motor rotation number, and these individual parameters are further set for each traveling velocity. According to the present embodiment, the minimum value and the maximum value for the traveling velocity (per minute) are 5 m/min and 100 m/min, respectively, and each traveling velocity is set at an interval of 5 m/min. That is, as for these parameters, a set of different parameters corresponding to each traveling velocity class is set.

Here, the respective individual parameters for the P gain adjustment, the I gain adjustment, and the D gain adjustment with regard to the track shift amount are steering control parameters for controlling the traveling direction of the AGV 20 to right and left such that the AGV 20 travels along the line by controlling the magnitude of difference in the numbers of rotations of the right and left wheels so that the track shift amount becomes close to 0.

The respective individual parameters for the P gain adjustment, the I gain adjustment, and the D gain adjustment with regard to the motor rotation number are velocity control parameters for controlling the traveling direction of the AGV 20 to right and left such that the AGV 20 travels at the target velocity by controlling the magnitude of the average values of the numbers of rotations of the right and left wheels so that the motor rotation number (i.e., the velocity of the AGV 20) becomes close to the target value.

That is, the numbers of rotations of the right and left wheels of the AGV 20 are calculated by executing subtraction and addition on the average values of the numbers of rotations of the right and left wheels calculated by the PID control with the traveling parameter for the motor rotation number by the magnitude of difference between the numbers of rotations of the right and left wheels calculated by the PID control with the traveling parameter for the track shift amount.

The parameters for the P gain adjustment, the I gain adjustment, and the D gain adjustment for the track shift amount are parameters for adjusting the shift of the center position with respect to the reference position, the P gain adjustment and the D gain adjustment having a larger value have a higher correction capability for the track shift amount, and the I gain adjustment having a smaller value has a higher correction capability for the track shift amount. With these individual parameters, the difference in the number of rotations between the right and left wheel motors 78R and 78L is controlled such that the track shift amount becomes close to 0. That is, the steering of the AGV 20 is controlled such that the AGV 20 travels along the line. This control reduces a lateral sway caused by the repeated zigzag traveling of the AGV 20 and enables the smooth traveling of the AGV 20.

The parameters for the P gain adjustment (velocity P value), the I gain adjustment (velocity I value), and the D gain adjustment (velocity D value) for the motor rotation number are parameters for adjusting the shift amount of the average values of the numbers of rotations of the right and left wheel motors 78R and 78L, i.e., the velocity of the AGV 20, with respect to the target value, the P gain adjustment and the D gain adjustment having a larger value have a higher correction capability for the shift amount with respect to the target value of the velocity, and the I gain adjustment having a smaller value has a higher correction capability for the shift amount with respect to the target value of the velocity. With these individual parameters, the average values of the numbers of rotations of the right and left wheel motors 78R and 78L, i.e., the velocity of the AGV 20, is controlled. This control reduces a longitudinal sway caused by acceleration and deceleration of the AGV 20 and enables the smooth traveling of the AGV 20.

As described below, the respective individual parameters for the P gain adjustment, the I gain adjustment, and the D gain adjustment with regard to each of the track shift amount and the motor rotation number are set so as to reduce an evaluation value (sway width value) regarding the zigzag traveling caused by repeated and alternate turns in the right-left direction of the AGV 20 and an evaluation value (back-and-forth sway value) regarding the magnitude of back-and-forth sway caused by repeated acceleration and deceleration in the front-back direction. The reason is that, when the respective individual parameters for the P gain adjustment, the I gain adjustment, and the D gain adjustment are not appropriate, the continuous traveling increases zigzag traveling or back-and-forth sway and finally results in a traveling failure of the AGV 20.

The basic traveling parameters further include individual parameters for the AGV traveling velocity, the acceleration rate, the deceleration rate, the spin velocity, the spin acceleration rate, the stop distance during derailment, and the stop deceleration rate due to obstacle detection. These parameters are further set for each weight. According to the present embodiment, the minimum value of the load is 0 kg (no load), the maximum value is 200 kg, and each weight is set at an interval of 10 kg. That is, as for these parameters, a set of different parameters corresponding to each traveling velocity class is set.

The parameter for the AGV traveling velocity is an individual parameter for the target traveling velocity (m/min) of the AGV 20, and the average rotation numbers of the right and left wheel motors 78R and 78L are controlled by this individual parameter.

The parameter for the acceleration rate is an individual parameter for the acceleration rate (mm/sect) until the AGV 20 reaches the target velocity, and the average rotation numbers of the right and left wheel motors 78R and 78L are controlled by this individual parameter.

The parameter for the deceleration rate is an individual parameter for the deceleration rate (mm/sect) until the AGV 20 reaches the target velocity, and the average rotation numbers of the right and left wheel motors 78R and 78L are controlled by this individual parameter.

The parameter for the spin velocity is an individual parameter for the angular velocity (deg/sect) at which the AGV 20 spins (i.e., turns left or turns right), and the rotation numbers of the right and left wheel motors 78R and 78L are controlled by this individual parameter.

The parameter for the spin acceleration rate is an individual parameter for each acceleration rate (deg/sect) at which the AGV 20 starts to spin, and the numbers of rotations of the right and left wheel motors 78R and 78L are controlled by this individual parameter.

The relationship between the basic traveling control parameter and the PID traveling control parameter is described below. When there is an attempt to calculate the numbers of rotations of the right and left wheel motors 78R and 78L using only the basic traveling control parameter, it is difficult to travel along the line without zigzag traveling and travel smoothly at the target velocity without sudden acceleration or sudden deceleration. Therefore, feedback control is performed by the PID control using the PID traveling control parameter on the numbers of rotations of the right and left wheel motors 78R and 78L so that it is possible to travel along the line without zigzag traveling and travel smoothly at the target velocity without sudden acceleration or sudden deceleration.

Next, the optimization processing of a traveling parameter is described. The purpose of optimizing the traveling parameter is to set the traveling parameter suitable for an area, such as a factory or a warehouse, where the AGV 20 is located and used.

The optimization processing of a traveling parameter is performed for each traveling parameter that is assigned corresponding to the traveling state of the AGV 20. As described above, the traveling state of the AGV 20 corresponds to the load of the cargo being transported, the traveling velocity of the AGV 20, the current position of the AGV 20, the back-and-forth sway value, the swing width value, the traveling route, and the date and time of execution.

Although the optimization processing of the traveling parameter is described below by focusing only on the load of the cargo being transported by the AGV 20 as the traveling state of the AGV 20, other traveling states, i.e., the traveling velocity of the AGV 20, the current position of the AGV 20, and the traveling route of the AGV 20, are also considered in the actual optimization processing.

When the optimization processing of the traveling parameter is performed, the AGV 20 travels multiple times along a predetermined traveling route using the traveling parameter assigned corresponding to the traveling state of the AGV 20, the value (hereinafter referred to as "back-and-forth sway value") of back-and-forth sway (longitudinal sway) during traveling and the value (hereinafter referred to as "sway width value") of the right-and-left sway (lateral sway) width are measured as evaluation values, and the traveling parameter is optimized such that the evaluation values become the highest. When the optimization processing of a certain individual parameter is performed, all other individual parameters are set to fixed values. For example, when the individual parameter for the P gain adjustment on the track shift amount is optimized, the values of the other individual parameters are fixed. The same applies to the optimization of the other individual parameters.

Here, the back-and-forth sway value represents the number of times (or the degree) the AGV 20 rapidly accelerates or rapidly decelerates during traveling. As described above, sudden acceleration or sudden deceleration is determined based on the output of the inertial sensor (acceleration sensor) 90. The number of times of rapid acceleration or rapid deceleration is counted at an interval of a second predetermined time (e.g., 10 msec).

The sway width value is the shift amount (the degree) by which the center position of the AGV 20 shifts from the reference position of the line during traveling. The shift amount is as described with reference to FIG. 11 and, according to the present embodiment, the average value (or the maximum value), at an interval of the first predetermined time, of the shift amount detected at an interval of the second predetermined time during traveling is measured as a sway width value. When the shift amount exceeds 6, the shift amount is set to 6 as it is not detectable by the line sensor 88.

One example of the method for optimizing the traveling parameter based on experiment result data at an experimental laboratory is a method for applying accumulated experiment results to the well-known Bayesian estimation method. In a case where the default value of a traveling parameter is set based on experiment result data, the processing of optimization (hereinafter may be referred to as "optimization processing") is performed before the AGV 20 is shipped from the factory.

According to other embodiments, the traveling parameter set for the similar AGV already used in an area such as a factory or a warehouse may be set as a default value. This traveling parameter is a traveling parameter corresponding to the load of the cargo transported by the AGV 20.

Here, the method for optimizing the experiment result data by using the Bayesian estimation method is described. The target experiment result data to be optimized is input, and the conditions for optimization are specified. The conditions for optimization are an output definition and an objective function. According to the present embodiment, the output definition is a load range (e.g., 0 to 50, 50 to 100, 100 to 150, or 150 to 200 kg), and the objective function is the sum of the back-and-forth sway value and the swing width. Therefore, when the optimization processing is applied to the experiment result data, the traveling parameter with which the condition designated by the objective function, i.e., the expected value of the sum of the back-and-forth sway value and the swing width is minimized is calculated as a traveling parameter for each traveling state (here, the load range).

Determination of Default Value

First, the default value of the traveling parameter is determined. The default value of the traveling parameter is a provisional traveling parameter that is set before the optimization of the traveling parameter. Although any numerical value may be input as the default value of the traveling parameter as long as the AGV 20 travels normally, it is desirable to input a numerical value that is as likely as possible so as to reduce the number of experiments for optimizing the traveling parameter. For example, the default value of the traveling parameter may be set by assigning, to the default value of the traveling parameter, the traveling parameter that was optimized in the past based on data (hereinafter referred to as "experiment result data") on the experiment result obtained by conducting a traveling test of the AGV 20 in advance in an experimental environment (experimental laboratory).

Here, the load of the cargo being transported by the AGV 20 is the load that is set in an experimental design. For example, experimental conditions such as the traveling parameter optimized based on the experiment result data, the traveling route, and the configuration of the AGV are recorded in the database 18, and the traveling parameter having the similar experimental conditions such as the traveling route and the configuration of the AGV and optimized in the past is assigned to the default value of the traveling parameter so that the default value of the traveling parameter may be specified. The reason is that the traveling parameter having the similar experimental conditions and optimized in the past may be regarded as a likely numerical value to some degree.

Creation of Experiment Design

Then, the optimization server 12 creates an experiment design based on the default value of the traveling parameter and a previously set experiment design creation condition. The experiment design creation condition described here is, for example, the number of experiments for optimizing one traveling parameter. A set of numerical values of traveling parameters corresponding to each load range is set.

According to the present embodiment, the optimization of the traveling parameter is performed by repeating experimental traveling by the set number of experiments for each load range and for each individual parameter. Although not described in the present embodiment, the optimization may be performed simultaneously for multiple load ranges and multiple individual parameters.

The optimization server 12 selects one load range and one individual parameter for which the optimization is to be executed. Then, the value of one individual parameter selected from the set of numerical values of the traveling parameters corresponding to the selected load range is set as a variable value, and the other individual parameters are set as fixed values.

Then, an experiment design is created to perform experimental traveling to acquire samples of evaluation values corresponding to the set number of experiments by changing one selected individual parameter as a variable value. The default values are assigned to the other individual parameters as fixed values.

The default value is set as the variable value of the one selected individual parameter for first experimental traveling among multiple number of times of experimental traveling, and the variable value of the one selected individual parameter is set by the design of experiments (the design of experiments method) using Bayesian optimization (Bayesian estimation method) for second and subsequent experimental traveling.

For example, the experiment result is applied to an estimation engine of the well-known Gaussian process regression so as to estimate the traveling parameter to be used in the subsequent experiment. For example, in a case where the steering P value is selected as a variable, the steering P value is used as an explanatory variable, the sum of the back-and-forth sway value and the swing width value is used as an objective variable, and a regression model is constructed between the explanatory variable and the objective variable by regression using a Gaussian process. Then, an acquisition function is calculated based on the regression model, and the traveling parameter used for the subsequent experiment is calculated based on the acquisition function.

Setting the variable value of one selected individual parameter for the traveling parameter to be used in the subsequent experiment corresponds to, in other words, setting a reasonable sample to improve the objective variable as the subsequent sample based on the current sample.

The acquisition function is an index for evaluating the validity of a sample candidate and, specifically, probability of improvement (PI), expected improvement (EI), or mutual information (MI), or the like, is applicable. For example, in probability of improvement (PI), the validity of a sample candidate is evaluated based on the magnitude of probability with which the sample candidate improves the regression model.

Specifically, the optimization server 12 sets the default value as the traveling parameter selected as a variable for the first traveling. Then, the optimization server 12 uses the traveling parameter used for each traveling from the first traveling to N-th (N is an integer that is 1 or more) traveling as an explanatory variable, uses the evaluation value of evaluation for each traveling from the first traveling to the N-th traveling as an objective variable, constructs a regression model by Gaussian process regression, calculates an acquisition function based on the constructed regression model, and determines (estimates) the traveling parameter for N+1-th traveling, i.e., the traveling parameter to be used for the subsequent experiment, based on the acquisition function.

As described above, as the experimental traveling design, multiple number (corresponding to the number of experiments) of times of traveling is designed, in which the traveling parameter is changed for each traveling. Specifically, the experimental traveling design is a design for the traveling parameters in which, among the unique parameters, the unique parameter selected as a variable value is set to the value determined by the design of experiments (the design of experiments method) using Bayesian optimization (the Bayesian estimation method) for each of the multiple number of times of experimental traveling, and the other unique parameters are set to fixed values.

As described above, the default value of the traveling parameter is set at the beginning of the experiment, and the traveling parameter is automatically set by the design of experiments method based on the experiment result data for the second and subsequent times as described below. Thus, as the experimental traveling design, multiple number (corresponding to the number of experiments) of times of traveling is designed, in which the traveling parameter is changed for each traveling.

Execution of Experimental Traveling

The optimization server 12 transmits, to the management server 16, the range of load values and the traveling parameter for each traveling among multiple number of times of experimental traveling as an experimental traveling design.

The management server 16 acquires the traveling state from the AGVs 20 and observes the load of the cargo transported by each of the AGVs 20 and the traveling situation (or use situation). Then, the AGV 20 that is not in use (not executing a traveling instruction), i.e., is in a standby state, and transports a cargo whose load is in the range of load values in the experimental traveling design is designated as the AGV 20 that is to perform the experimental traveling. Then, the management server 16 transmits, to the designated AGV 20, the move instruction designating the moving route for executing the experimental traveling design and the control signal designating the traveling parameter for traveling along the moving route.

The AGV 20 travels along the designated traveling route at a factory or a warehouse with the designated traveling parameter in accordance with the control signal and detects the back-and-forth sway value and the swing width value as experiment results. The back-and-forth sway value and the sway width value are each detected and measured at an interval of the second predetermined time (e.g., 10 msec), which is shorter than the first predetermined time. The experiment results are transmitted to the management server 16 at an interval of the first predetermined time.

As described above, the experimental traveling corresponding to the number of experiments is executed (i.e., repeated) so that the experiment result data corresponding to the set number of experiments are acquired. The experiment result data is stored in the database 18 from the management server 16 in each case or collectively at an appropriate timing after the experimental traveling corresponding to the number of experiments is conducted and before the optimization processing is performed.

Calculation of Optimal Parameter

The optimization server 12 applies the experiment result to the Bayesian estimation method to optimize the traveling parameter and stores the optimized traveling parameter (or the target individual parameter). Specifically, when M number of times of experimental traveling is performed, the optimization server 12 uses the traveling parameter used for each traveling from the first traveling to M-th (M is an integer that is two or more) traveling as an explanatory variable, uses the evaluation value of evaluation for each traveling from the first traveling to the M-th traveling as an objective variable, constructs a regression model by Gaussian process regression, and based on the constructed regression model calculates, as an optimized traveling parameter, the traveling parameter with which the expected value of the objective variable is closest to the setting value. That is, the optimization server 12 calculates the evaluation value based on the experiment result stored in the database 18 from the management server 16 and calculates the optimized traveling parameter based on the calculated evaluation value. The value of the state desirable for traveling of the AGV 20 is set as the setting value. For example, in a case where the objective variable (evaluation value) is the sum of the back-and-forth sway value and the swing width value, the smaller the objective variable (evaluation value) is, the more desirable the state is for traveling of the AGV 20. In such a case, 0 is set as the setting value, and accordingly the traveling parameter with which the objective variable (evaluation value) is minimized is calculated as the optimized traveling parameter. In another example, in a case where the larger the objective variable (evaluation value) is, the more desirable the state is for traveling of the AGV 20, a sufficiently large value that is considered to be equivalent to infinity is set as the setting value, and accordingly the traveling parameter with which the objective variable (evaluation value) is maximized is calculated as the optimized traveling parameter. The reason why the expected value of the explanatory variable with which the objective variable is maximized or minimized is calculated as the optimized traveling parameter is because the magnitude of the evaluation values is reversed depending on the evaluation method. Experimental traveling is executed for various loads, and the experiment result for each load is stored in the database 18. Therefore, the optimization processing of the traveling parameter is performed by calculating the traveling parameter with which the expected value of the objective variable is closest to the setting value with regard to each load range.

As described above, the traveling parameter is optimized by repeating the experimental traveling corresponding to the set number of experiments for each individual parameter and for each load range. The optimization server 12 variably selects one load range or one individual parameter for which optimization is executed such that, after the optimum parameter is calculated for one load range with regard to one individual parameter, the optimum parameter is calculated for one load range with regard to another individual parameter, and repeatedly executes the process from the above-described experiment design creation until the calculation of the optimal parameter. In this manner, the optimum parameters are finally calculated for all the load ranges with regard to all the individual parameters.

Traveling Control on AGV 20 using Optimization Parameter Next, the traveling control on the AGV 20 is described. Here, the traveling control in a case where the AGV 20 actually transports a cargo by using an optimization parameter at an area such as a factory or a warehouse is described. According to the present embodiment, the traveling of the AGV 20 in the usage environment is controlled using the traveling parameter having undergone optimization processing. As described above, the administrator of the management server 16 may input a transport request. Therefore, when the AGV 20 travels in the usage environment, at least the automatic traveling system 10a where the management server 16 and the AGV 20 are communicatively connected to each other is applied to the usage environment.

Figure 13:
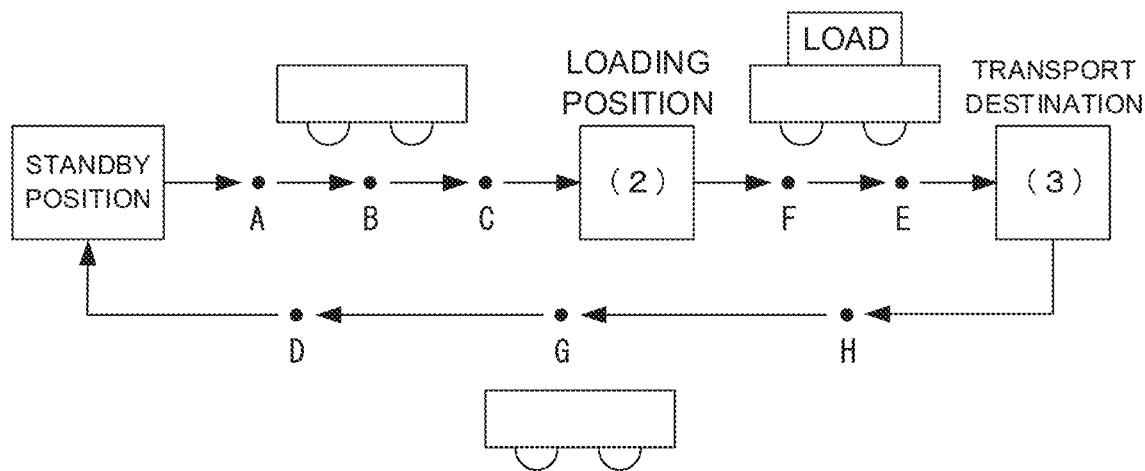
FIG. 13 is a diagram schematically illustrating an example of a traveling route and the presence or absence of a load when the AGV transports a cargo in the usage environment.

FIG. 13 illustrates an example of each traveling route in which, in response to a transport request from the device (2) for transporting a cargo from the device (2) to the device (3), the designated AGV 20 moves from the standby position to the loading position, transports the cargo from the loading position to the transport destination, and returns from the transport destination to the standby position.

In FIG. 13, the illustration of the load on the AGV 20 indicates that the AGV 20 is pulling the cart 200. Although FIG. 13 illustrates even a turning point as simple passing, left-turning or right-turning points are also actually included, as illustrated in FIG. 7.

Therefore, in the example of the traveling route illustrated in FIG. 13, as may also be understood with reference to FIG. 7, based on the control signal from the management server 16, the designated AGV 20 first goes straight from the standby position, passes through the points A and B, turns left at the point C, and goes straight to the loading position, i.e., the position where the device (2) is located. Subsequently, the AGV 20 is loaded with a cargo (i.e., connects the cart 200 so as to be pulled), goes straight from the loading position to the point F, turns left at the point F, goes straight to the point E, turns right at the point E, and goes straight from the point E to the transport destination, i.e., the position where the device (3) is located. Then, at the transport destination, the AGV 20 disengages the connection state with the cart 200, goes straight from the transport destination to the point H, turns left at the point H, goes straight to the point G, turns left at the point G, goes straight from the point G, passes the point D, and returns to the standby position.

In these cases (here, these cases are collectively referred to as "case 1") of traveling from the standby position to the loading position and traveling from the transport destination to the standby position, the AGV 20 is not pulling the cart 200 nor any cargo. Conversely, in the case (herein referred to as "case 2") of traveling from the loading position to the transport destination, the AGV 20 is pulling the cart 200 and the cargo. Therefore, at least the loads are different in the case 1 and the case 2.

As it is safe to travel at a high velocity on a long traveling route with many straight lines, it is considered that high acceleration is applied immediately after the start of traveling, traveling is conducted at a relatively high velocity, and then gradual deceleration is applied after passing through the middle of the traveling route. On the other hand, as traveling at a high velocity on a short traveling route with many curves easily causes zigzag traveling and produces risks, it is considered that low acceleration is applied as compared to the case of going straight immediately after the start of traveling, traveling is conducted at a low velocity as compared to the case of going straight, and deceleration is applied at the end of the traveling route.

As described above, the traveling control on the AGV 20 is different depending on the load and the traveling velocity for each traveling route, and therefore the traveling parameter is also different. Thus, according to the present embodiment, the traveling of the AGV 20 is controlled by using the traveling parameter corresponding to the load and the traveling velocity for each traveling route.

According to the present embodiment, when the AGV 20 travels, the management server 16 determines the traveling route of the AGV 20 and transmits, to the AGV 20, a table (see FIG. 14) of the traveling parameters corresponding to the determined traveling route. The table (corresponding to traveling parameter designation information) of the traveling parameters is hereinafter referred to as "traveling parameter table".

FIG. 14 is a table illustrating an example of an optimization parameter table. As illustrated in FIG. 14, the optimization parameter table is a table generated by using the traveling parameters that have been subjected to the optimization processing, and the traveling parameter table is described corresponding to the ID of a traveling route.

The ID of a traveling route is the identification information assigned to the traveling route and, for example, in the map illustrated in FIG. 7, when there are multiple (e.g., 20) traveling routes, the IDs of the 20 traveling routes are described in the optimization parameter table.

The traveling parameter table is a table describing the identification information on the traveling parameter determined by the class of the load of the cargo transported by the AGV 20 and the class of the traveling velocity of the AGV 20. The traveling parameter is determined during the above-described optimization processing. The traveling parameters include the individual parameters illustrated in FIG. 12.

FIG. 15 is a table illustrating an example of a traveling parameter table A. The traveling parameter table A describes a set of numerical values of the traveling parameters corresponding to the class of the load and the class of the traveling velocity. FIG. 15 illustrates only the identification information (here, an alphabet and a number) of the traveling parameter. This means that each traveling parameter is different. In the example illustrated in FIG. 15, the load is classified into four classes, i.e., 0 to 50 kg, 50 to 100 kg, 100 to 150 kg, and 150 to 200 kg.

With regard to the class of the load, the numerical value described on the right side of the numerical range is not included in the class. Therefore, the case of 0 to 50 kg represents equal to or more than 0 kg and less than 50 kg. The same applied to the class of the traveling velocity described below.

The traveling velocity is classified into four classes, i.e., 0 to 5 m/min, 5 to 10 m/min, 10 to 15 m/min, and 15 to 20 m/min.

The optimization parameter table illustrated in FIG. 14 and the traveling parameter table illustrated in FIG. 15 are examples and should not be limited. The traveling route may be changed as appropriate in accordance with the usage environment, and the class of the load and/or the class of the traveling velocity may be further subdivided. In some usage environment, the classes of loads and/or the classes of traveling velocities may be combined.

In response to a received traveling instruction including the traveling route and the traveling parameter table from the management server 16, the AGV 20 travels in accordance with the traveling route. According to the present embodiment, the traveling instruction means a loading instruction to travel from the standby position to the loading position, a transport instruction to travel from the loading position to the transport destination, or a return instruction to travel from the transport destination to the standby position.

The AGV 20 performs predetermined operations (stopping, left turn, right turn, and velocity change according to the present embodiment) in accordance with an instruction from the management server 16 when traveling along the traveling route.

The traveling of the AGV 20 is controlled by using the traveling parameter that is determined by the class of the load and the class of the traveling velocity in the traveling parameter table received from the management server 16. The AGV 20 determines the traveling parameter to be used in accordance with the class of the load, which includes the load detected based on the output of the load sensor 86, and the class of the traveling velocity, which includes the traveling velocity instructed by the management server 16. That is, the traveling parameter is determined in accordance with the load and/or the traveling velocity among the traveling states.

For example, when the traveling velocity changes during traveling and the class of the traveling velocity in the traveling parameter table changes, the traveling parameter to be used is changed to the traveling parameter determined by the class of the load and the changed class of the traveling velocity.

It is unlikely that the load changes during traveling, but if the load changes and the class of the load in the traveling parameter table changes, the traveling parameter to be used is changed to the traveling parameter determined by the changed class of the load and the class of the traveling velocity.

According to the present embodiment, even when the AGV 20 transports a cargo in an area such as a factory or a warehouse, the traveling state of the AGV 20 is detected; therefore, the traveling state is accumulated in the database 18 and the traveling parameter is optimized regularly (e.g., once a month) so that the more appropriate traveling parameter for the usage environment of the AGV 20 may be generated and set.

In this case, the optimization server 12 optimizes each traveling parameter described in the traveling parameter table of the optimization parameter table by the above-described Bayesian estimation method using the traveling parameter described in the optimization parameter table and the traveling state from the previous optimization until the current optimization. Thus, the more appropriate traveling parameter may be set corresponding to the usage environment that changes over time.

As a matter of course, no experiment design is required during this optimization processing, and therefore no experiment design nor traveling experiment is conducted.

The identification information on the traveling parameter table may be described in the optimization parameter table, and the traveling parameter table indicated by the identification information corresponding to the traveling route may be transmitted to the AGV 20.

Figure 16:
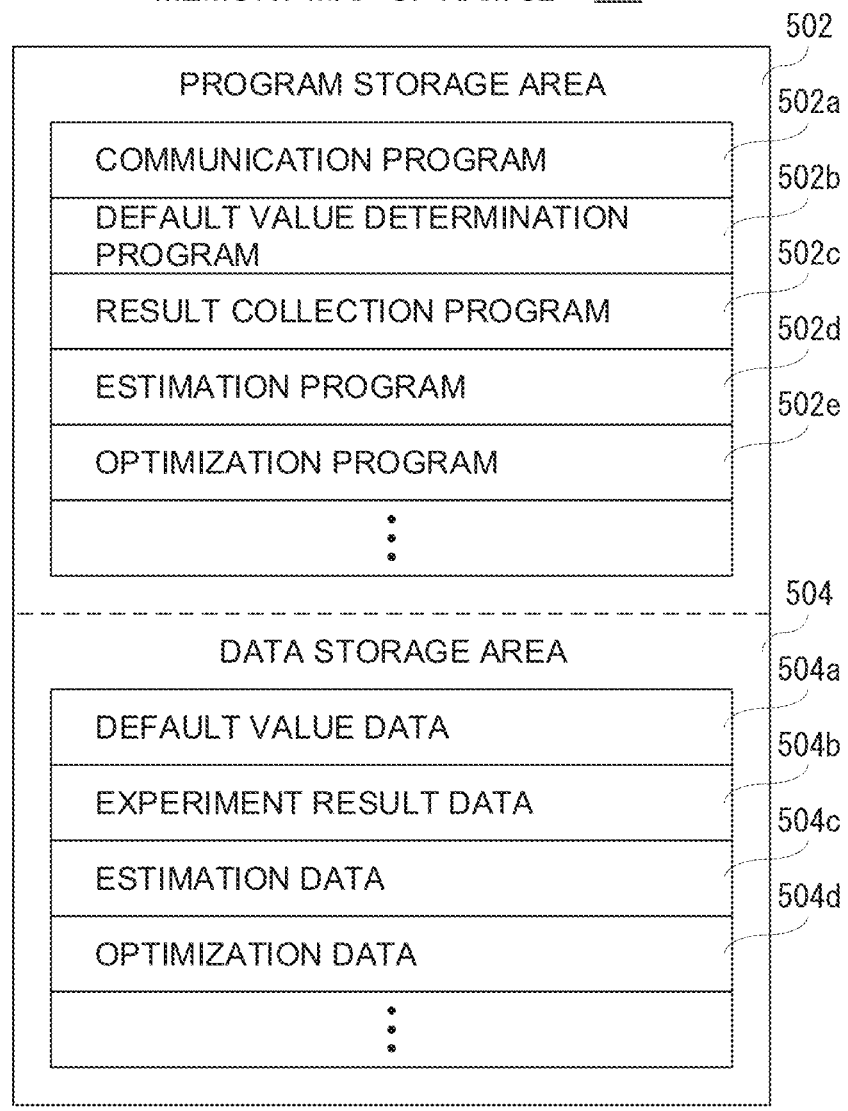
FIG. 16 is a table illustrating an example of a memory map of a RAM of the optimization server illustrated in FIG. 2.

FIG. 16 is a table illustrating an example of a memory map 500 of the RAM 32 included in the optimization server 12 illustrated in FIG. 2. As illustrated in FIG. 16, the RAM 32 includes a program storage area 502 and a data storage area 504.

The program storage area 502 stores a program (information processing program) executed by the CPU 30 of the optimization server 12, and the information processing program includes a communication program 502*a*, a default value determination program 502*b*, a result collection program 502*c*, an estimation program 502*d*, an optimization program 502*e*, and the like.

The communication program 502*a* is a program for communicating with other devices or computers, such as the database 18, using the communication device 34. The default value determination program 502*b* is a program for determining the default value of the traveling parameter when the optimization processing is executed.

The result collection program 502*c* is a program for collecting experiment results (experiment result data) from the database 18. Experiment results may be collected from the management server 16.

The estimation program 502*d* is a program for estimating the information that is to be subjected to the subsequent experiment, i.e., the traveling parameter that is to be subjected to the experiment, based on the experiment result by Gaussian process regression (machine learning).

The optimization program 502*e* is a program for optimizing the target traveling parameter based on the experiment result. Further, the optimization program 502*e* is a program for optimizing the traveling parameter described in the traveling parameter table of the optimization parameter table. As described above, the optimization processing is performed by applying the experiment result to the Bayesian estimation method.

The program storage area 502 also stores other programs necessary to execute the information processing program.

The data storage area 504 stores default data 504*a*, experiment result data 504*b*, estimation data 504*c*, and optimization data 504*d*.

The default data 504*a* is data about the default value of the traveling parameter. The experiment result data 504*b* is data about the experiment result. The estimation data 504*c* is data about the traveling parameter estimated based on the experiment result. The optimization data 504*d* is data about the optimized traveling parameter.

The data storage area 504 stores other data necessary to execute the information processing program and includes a timer (counter) and a flag necessary to execute the information processing program.

Figure 17:
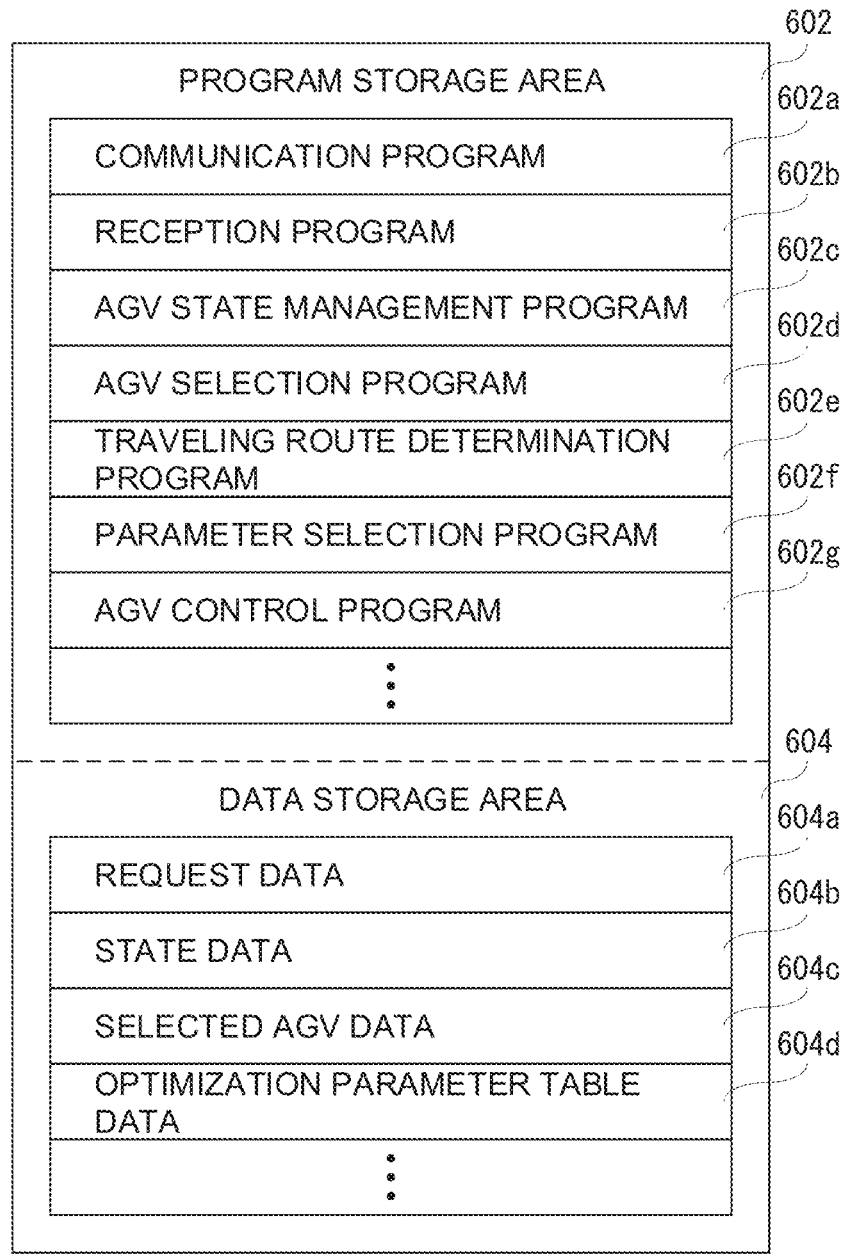
FIG. 17 is a table illustrating an example of a memory map of a RAM of the management server illustrated in FIG. 3.

FIG. 17 is a table illustrating an example of a memory map 600 of the RAM 52 included in the management server 16 illustrated in FIG. 3. As illustrated in FIG. 17, the RAM 52 includes a program storage area 602 and a data storage area 604.

The program storage area 602 stores a program (management program) executed by the CPU 50 of the management server 16, and the management program includes a communication program 602*a*, a reception program 602*b*, an AGV state management program 602*c*, an AGV selection program 602*d*, a traveling route determination program 602*e*, a parameter selection program 602*f*, an AGV control program 602*g*, and the like.

The communication program 602*a* is a program for communicating with other devices or computers, such as the AGV 20, using the first communication device 54. Communications are executed via an access point in some cases. Further, the communication program 602*a* is also a program for communicating with other devices or computers, such as the database 18, using the second communication device 56.

The reception program 602*b* is a program for receiving a transport request. The AGV state management program 602*c* is a program for managing the traveling state of each of the one or more AGVs 20 that are used for a transport operation among the AGVs 20 located at an area such as a factory or a warehouse. Specifically, the traveling state of each of the AGVs 20 transmitted from the AGV 20 at an interval of a predetermined time is received and stored in the RAM 52 and also stored (registered) in the database 18.

The AGV state management program 602*c* is a program for acquiring the traveling state of each of the AGVs 20 transmitted from the AGV 20 and storing the traveling state in the database 18.

The AGV selection program 602*d* is a program for, based on the use situation of each of the AGVs 20, selecting the AGV 20 to be used to transport a cargo.

The traveling route determination program 602*e* is a program for determining the traveling route of the AGV 20 from the standby position to the loading position, the traveling route of the AGV 20 from the loading position to the transport destination, and the traveling route from the transport destination to the standby position.

The parameter selection program 602*f* is a program for selecting the traveling parameter table corresponding to the traveling route when the traveling of the AGV 20 is controlled.

The AGV control program 602*g* is a program for designating the target AGV 20 to be controlled and for transmitting, to the AGV 20, the traveling instruction including the determined traveling route and the selected traveling parameter table and the operation instruction for a predetermined operation. As described above, during the experiment, the traveling route is designated (determined) by the optimization server 12, and the traveling parameter set by the optimization server 12 is included in the traveling instruction instead of the traveling parameter table.

The program storage area 602 also stores other programs necessary to execute the management program. For example, it stores a program for temporarily stopping the traveling AGV 20 (referred to as "the target AGV 20" for convenience of explanation) when the different AGV 20 has stopped in front of the target AGV 20 or the different AGV 20 has entered an intersection first.

The data storage area 604 stores request data 604a, state data 604b, selected AGV data 604c, and optimization parameter table data 604d.

The request data 604a is data about a transport request from the computer 22 located at an area such as a factory or a warehouse. When transport requests are made simultaneously or synchronously from the computers 22, the request data 604a is data about the multiple transport requests.

The state data 604b is data on the traveling state of each of the AGVs 20. The selected AGV data 604c is data about the identification information on the AGV 20 that has been selected to be used in response to the transport request.

The optimization parameter table data 604d is the data on the optimization parameter table as illustrated in FIG. 14. The optimization parameter table data 604d is acquired from the database 18 before the control on the traveling of the AGV 20.

The data storage area 604 stores other data necessary to execute the management program and includes a timer (counter) and a flag necessary to execute the management program.

Figure 18:
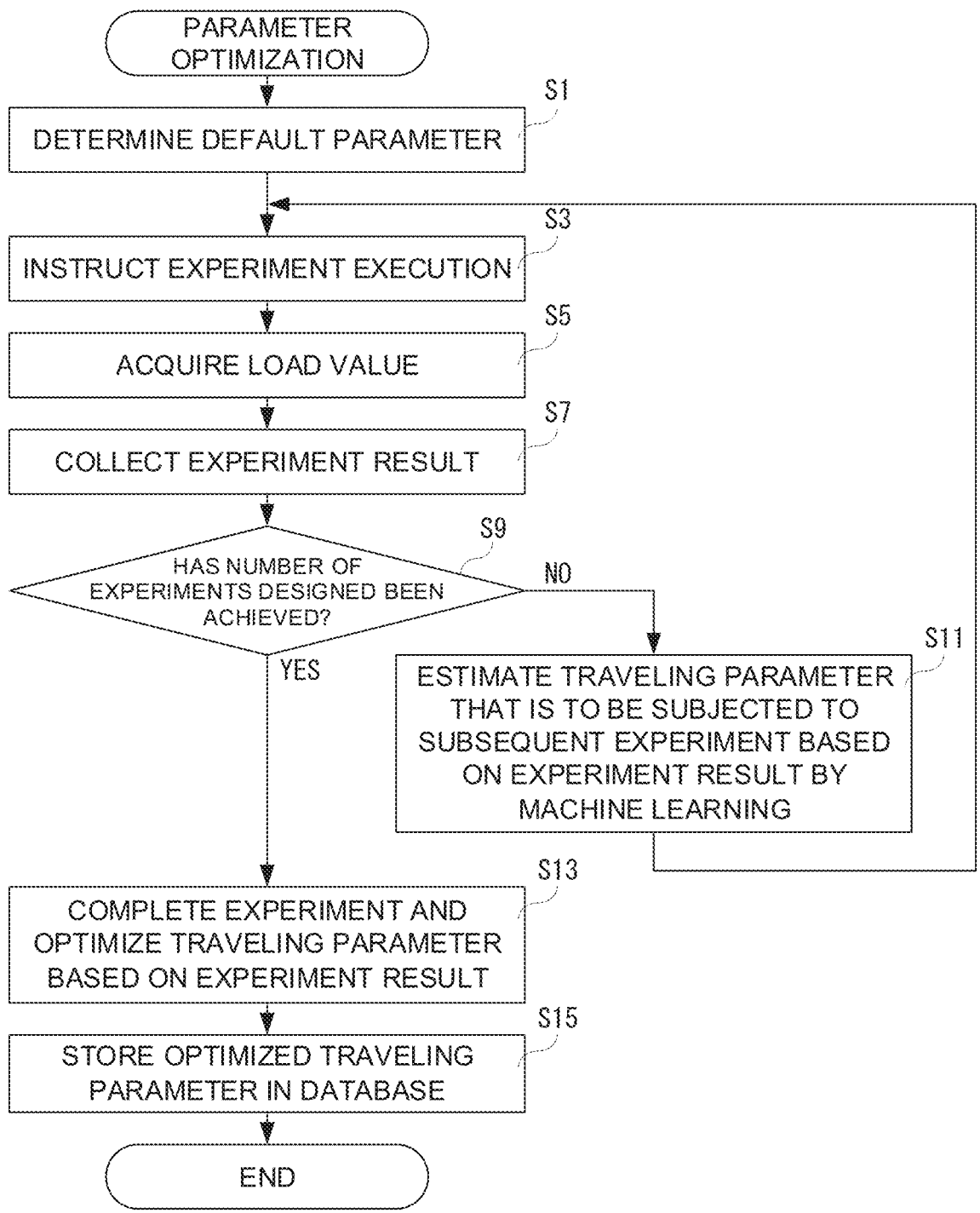
FIG. 18 is a flowchart illustrating an example of parameter optimization processing of a CPU of the optimization server illustrated in FIG. 2.

FIG. 18 is a flowchart illustrating parameter optimization processing that is an example of the information processing executed by the CPU 30 built in the optimization server 12 illustrated in FIG. 2. As illustrated in FIG. 18, when the parameter optimization processing starts, the CPU 30 determines the default value of the traveling parameter at Step S1. The method for determining the default value of the traveling parameter is described above.

At the subsequent Step S3, the execution of the experiment is instructed (experiment instruction). Here, the CPU 30 uses the communication device 34 to transmit, to the management server 16, the experiment instruction including the load value and the traveling parameter for the experiment. At the start of the parameter optimization processing, the experiment instruction includes the default value of the traveling parameter. For the second and subsequent times, the experiment instruction includes the traveling parameter estimated by machine learning. Accordingly, in the management server 16, the CPU 50 determines that the AGV 20 pulling the load having the load value included in the experiment instruction is the AGV 20 to be used and sets the traveling parameter included in the experiment instruction in the determined AGV 20.

At the subsequent Step S5, the load value is acquired. Specifically, at the start of the experiment, the CPU 30 acquires, from the management server 16, the load value of the cargo transported by the AGV 20 used in the experiment. Then, the experiment result is collected from the management server 16 at Step S7, and it is determined whether the number of experiments designed has been achieved at Step S9. That is, at Step S9, the CPU 30 determines whether the experiment has been completed.

When "NO" at Step S9, that is, the number of experiments designed has not been achieved, the traveling parameter that is to be subjected to the subsequent experiment is estimated based on the experiment result by machine learning at Step S11. Conversely, when "YES" at Step S9, that is, the number of experiments designed has been achieved, the traveling parameter is optimized based on the experiment result at Step S13. Then, at Step S15, the optimized traveling parameter is stored (registered or updated) in the database 18, and the parameter optimization processing is ended.

Figure 19:
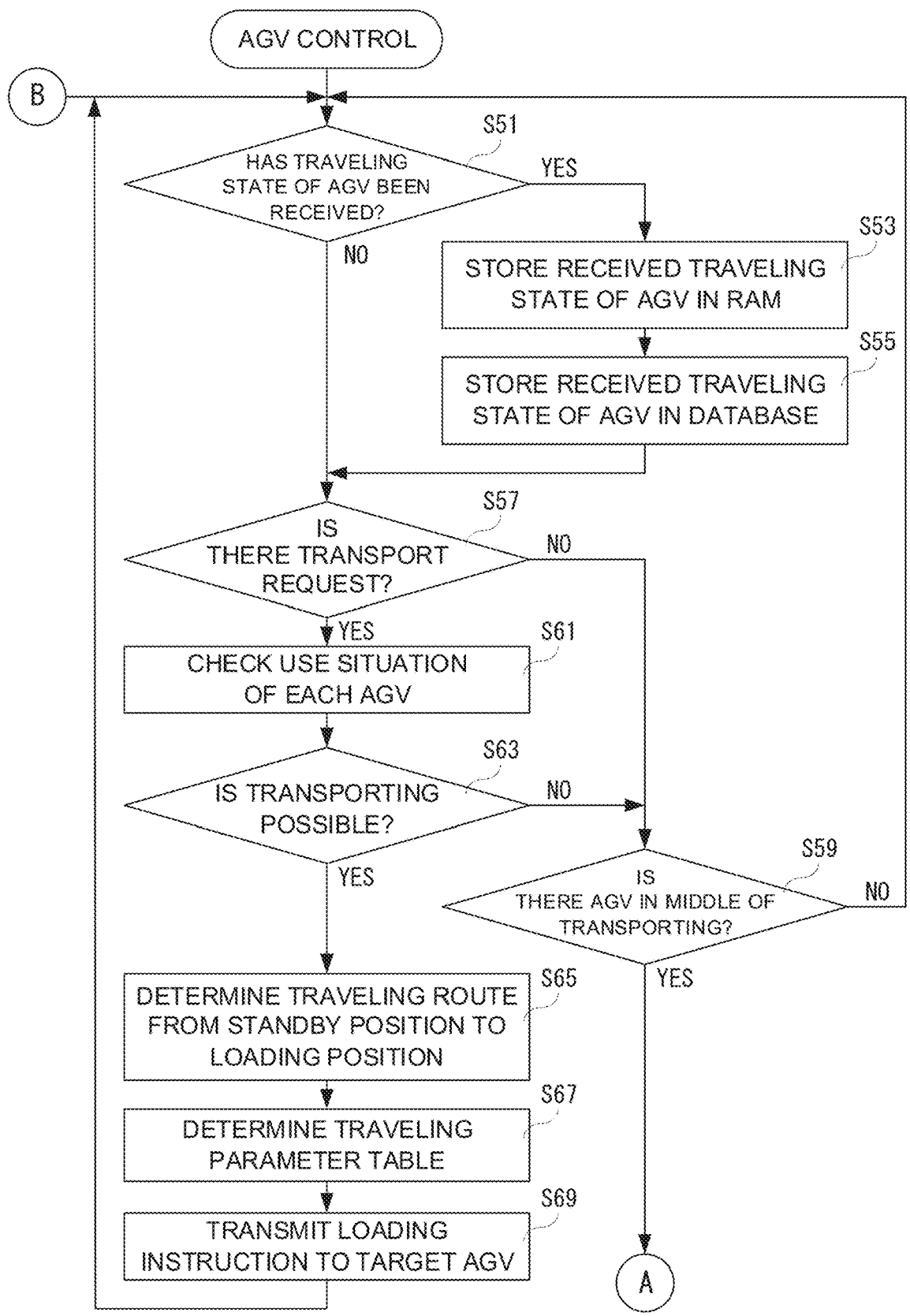
FIG. 19 is a flowchart illustrating part of an example of AGV control processing of a CPU of the management server illustrated in FIG. 3.
Figure 20:
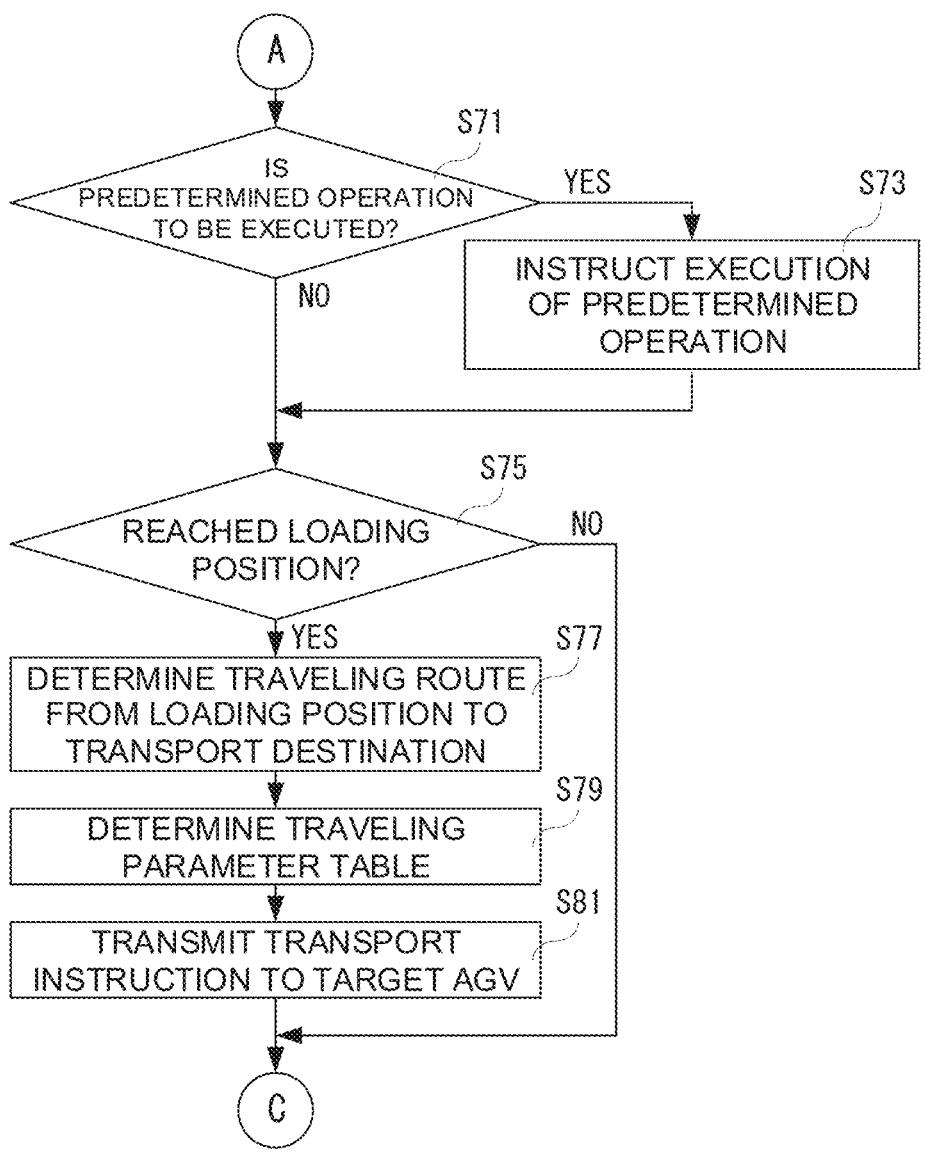
FIG. 20 is a flowchart of another part of the AGV control processing of the CPU of the management server illustrated in FIG. 3 subsequent to FIG. 19.
Figure 21:
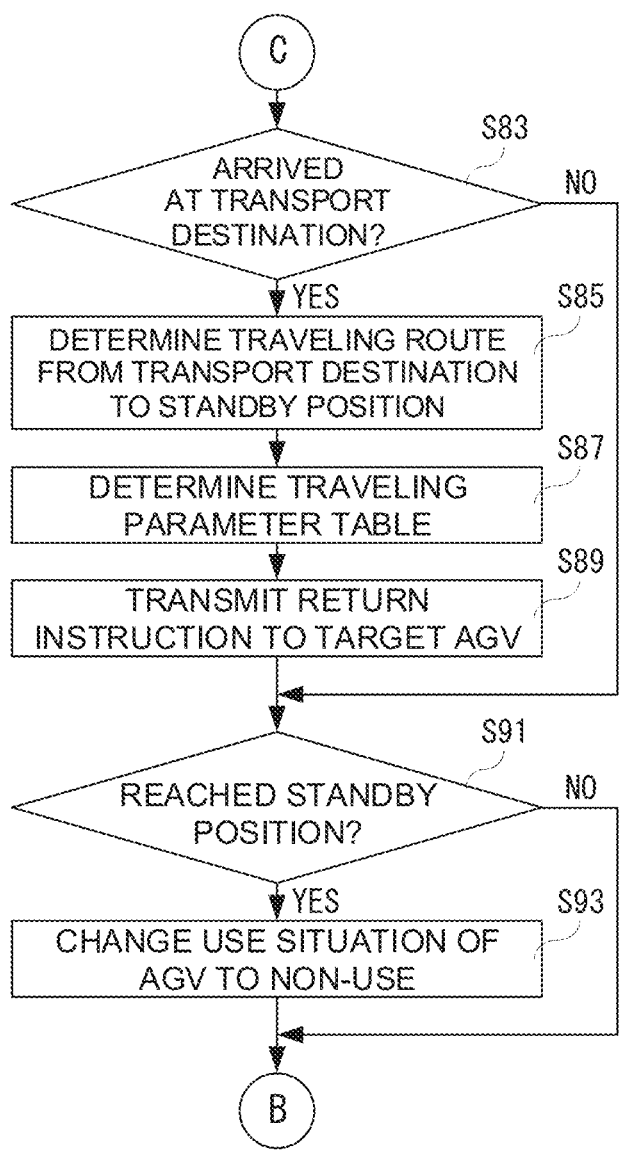
FIG. 21 is a flowchart of another part of the AGV control processing of the CPU of the management server illustrated in FIG. 3 subsequent to FIG. 20.

FIGS. 19 to 21 are flowcharts illustrating an example of AGV control processing executed by the CPU 50 built in the management server 16 illustrated in FIG. 3. The AGV control processing is processing for traveling control when the AGV 20 actually transports a cargo at an area, such as a factory or a warehouse, using the optimization parameter.

As illustrated in FIG. 19, when the AGV control processing starts, the CPU 50 of the management server 16 determines whether the traveling state of the AGV 20 has been received at Step S51.

When "NO" at Step S51, that is, the traveling state of the AGV 20 has not been received, the processing proceeds to Step S57. Conversely, when "YES" at Step S51, that is, the traveling state of the AGV 20 has been received, the received traveling state of the AGV 20 is stored (updated) at Step S53, the received traveling state of the AGV 20 is stored in the database 18 at Step S55, and the processing proceeds to Step S57. The state data 604b is updated at Step S53, and the log of the state data stored in the database 18 is updated at Step S55.

At Step S57, it is determined whether there is a transport request from any of the computers 22. When "NO" at Step S57, that is, there is no transport request from any of the computers 22, it is determined whether there is the AGV 20 in the middle of transporting at Step S59. Here, "in the middle of transporting" includes not only the traveling state in which the cargo is actually being transported but also the traveling state for moving to the loading position to load the cargo and the traveling state for moving to return to the standby position after the cargo is transported to the transport destination.

When "NO" at Step S59, that is, there is none of the AGV 20 in the middle of transporting, the processing returns to Step S51. Conversely, when "YES" at Step S59, that is, there is the AGV 20 in the middle of transporting, the processing proceeds to Step S71 illustrated in FIG. 19.

When "YES" at Step S57, that is, there is a transport request from any of the computers 22, the use situation of each of the AGVs 20 is checked at Step S61. Here, the CPU 50 refers to the selected AGV data 604c to check the use situation of each of the AGVs 20. The CPU 50 determines that the AGV 20 whose identification information (AGV ID) is described in the selected AGV data 604c is in use and the AGV 20 whose identification information is not described is not in use.

At the subsequent Step S63, it is determined whether transporting is possible. Specifically, the CPU 50 determines whether there is the AGV 20 that is not in use. When "NO" at Step S63, that is, transporting is not possible, the processing proceeds to Step S59. In this case, the computer 22 that has transmitted the transport request may be notified that transporting is not possible.

Conversely, when "YES" at Step S63, that is, transporting is possible, the traveling route from the standby position to the loading position is determined at Step S65. The traveling parameter table corresponding to the traveling route is determined from the optimization parameter table illustrated in FIG. 14 at the subsequent Step S67, the loading instruction is transmitted to the target AGV 20 at Step S69, and the processing returns to Step S51. According to the present embodiment, at Step S69, the CPU 50 transmits the traveling instruction including the traveling route determined at Step S65 and the traveling parameter table determined at Step S67 to the target AGV 20. The same applies to Steps S81 and S89 described below.

As illustrated in FIG. 20, at Step S71, it is determined whether a predetermined operation is to be executed. Here, it is determined whether the target AGV 20 has reached the position to stop, turn left, turn right, or change the velocity. When "NO" at Step S71, that is, a predetermined operation is not to be executed, the processing proceeds to Step S75. Conversely, when "YES" at Step S71, that is, a predetermined operation is to be executed, the execution of the predetermined operation is instructed to the target AGV 20 at Step S73, and then the processing proceeds to Step S75.

At Step S75, it is determined whether the AGV 20 has reached the loading position. When "NO" at Step S75, that is, the AGV 20 has not reached the loading position, the processing proceeds to Step S83 illustrated in FIG. 21. Conversely, when "YES" at Step S75, that is, the AGV 20 has reached the loading position, the traveling route from the loading position to the transport destination is determined at Step S77, the traveling parameter table corresponding to the traveling route is determined at Step S79, the transport instruction is transmitted to the target AGV 20 at Step S81, and the processing proceeds to Step S83.

In response to the received transport instruction, the AGV 20 starts to travel (i.e., transport) after the pulling arm 26 is connected to the cart 200.

As illustrated in FIG. 21, at Step S83, it is determined whether the AGV 20 has arrived at the transport destination. When "NO" at Step S83, that is, the AGV 20 has not arrived at the transport destination, the processing proceeds to Step S91.

Conversely, when "YES" at Step S83, that is, the AGV 20 has arrived at the transport destination, the traveling route from the transport destination to the standby position is determined at Step S85, the traveling parameter table corresponding to the traveling route is determined at Step S87, and the return instruction is transmitted to the target AGV 20 at Step S89.

In response to the received return instruction, the AGV 20 starts to travel after the pulling arm 26 is disconnected from the cart 200.

At the subsequent Step S91, it is determined whether the AGV 20 has reached the standby position. When "NO" at Step S91, that is, the AGV 20 has not reached the standby position, the processing returns to Step S51. Conversely, when "YES" at Step S91, that is, the AGV 20 has reached the standby position, the use situation of the target AGV 20 is changed to non-use at Step S93, and the processing returns to Step S51.

The processing from Steps S57 to S93 is executed for each of the AGVs 20 for which traveling control is executed. During the AGV control processing illustrated in FIGS. 19 to 21, when there is a transport request, the traveling route from the standby position to the loading position, the traveling route from the loading position to the transport destination, and the traveling route from the transport destination to the standby position are determined at the standby position, the loading position, and the transport destination, respectively; however, all the traveling routes may be determined when there is a transport request. In this case, when all the traveling routes are determined, the traveling parameter table corresponding to each traveling route may also be determined.

According to the present embodiment, as the experiment result is efficiently acquired based on the future experiment design and the traveling parameter is optimized based on the acquired experiment result, the appropriateness of the parameter may be efficiently improved.

According to the present embodiment, as the method combines the design of experiments method and estimation by Gaussian process regression, it is possible to make a strategic experiment design. That is, the experiment and the optimization processing are not performed for the combinations of the information on all the AGVs 20 and all the individual parameters but the experiment and the optimization processing are performed for a part of the combinations.

According to the above-described embodiment, when the AGV travels in the usage environment to transport a cargo, the control signal including the traveling parameter table corresponding to the traveling route is transmitted to the AGV; however, this does not need to be a limitation. The optimization parameter table may be previously downloaded to the AGV, and the control signal including the information designating the traveling parameter table corresponding to the traveling route may be transmitted to the AGV.

In this case, the management server may also designate the traveling parameter by referring to the load and the traveling velocity included in the traveling state. Therefore, even while the AGV is traveling, the load and the traveling velocity included in the traveling state are referred to, and when the load or the traveling velocity changes to a value that exceeds the class of the load or the class of the traveling velocity of the traveling parameter in use, the traveling parameter corresponding to the class of the changed load or the class of the changed traveling velocity may be designated.

The specific configuration of the optimization system and the AGV illustrated according to the above-described embodiment may be changed as appropriate in the actual product.

For example, although the AGV pulls the cart, a configuration may be such that a cargo is loaded on the AGV. In such a case, a load sensor capable of measuring the load of the loaded cargo is used. Although the load sensor detects the load, the management server may calculate the load when all the carts used are the same and the load of the cargo loaded at each site is fixed. In a case where the load is loaded on the AGV or the load is calculated by the management server, the traveling parameter corresponding to the load may be designated when the cargo is loaded.

Although the optimization server and the management server are installed separately according to the above-described embodiment, one server having the functions of both the optimization server and the management server may be installed. The database may be built in the optimization server or the management server.

According to the above-described embodiment, the experiment result is applied to the Bayesian estimation method to calculate the traveling parameter with which the expected value of the objective function is minimized for each load range so as to optimize the traveling parameter; however, this does not need to be a limitation. According to another embodiment, instead of using the Bayesian estimation method, the traveling parameter with which the sum of the back-and-forth sway value and the swing width value is minimized may be simply selected from the experimental data in the past and determined as the optimal traveling parameter.

What is claimed is:

1. A traveling parameter optimization system that optimizes a traveling parameter of a plurality of automatic traveling devices that travel based on a traveling instruction by conducting at least one experimental travel, the traveling parameter optimization system comprising:
   the plurality of automatic traveling devices;
   an experimental traveling design creation device that creates an experimental traveling design for the at least one experimental travel;
   a traveling instruction device that transmits the traveling instruction to the plurality of automatic traveling devices based on the created experimental traveling design;
   an acquisition device that acquires a measurement value that reflects a traveling state of the plurality of automatic traveling devices;
   an evaluation value calculation device that calculates an evaluation value based on the acquired measurement value; and
   a traveling parameter optimization device that calculates an optimized traveling parameter based on the calculated evaluation value in the at least one experimental travel, wherein
   the traveling parameter includes a different traveling parameter set for each class of a load, which is a weight of a cargo pulled or loaded by each of the plurality of automatic traveling devices,
   the traveling parameter is optimized for each class of the load of an optimization target, and
   the traveling instruction device further observes the load of the cargo transported by each of the plurality of automatic traveling devices, designates, out of the plurality of the automatic traveling devices, an automatic traveling device whose load is in the range of the load value of the class of the load of an optimization target in the experimental traveling design as a designated automatic traveling device that performs the at least one experimental travel, and transmits the traveling instruction to the designated automatic traveling device.

2. The traveling parameter optimization system according to claim 1, wherein the experimental traveling design creation device further designs, as the experimental traveling design, a multiple number of times of traveling in which the traveling parameter is changed for each traveling.

3. The traveling parameter optimization system according to claim 2, wherein
   the traveling parameter includes sets of multiple types of parameters for performing different controls during traveling of the plurality of automatic traveling devices, and
   the experimental traveling design creation device further designs the multiple number of times of traveling to designate each of one or more parameters, among all the sets of multiple types of parameters, as the travel parameter that is the optimization target and changes a designated parameter for each travel so as to optimize the designated parameter.

4. The traveling parameter optimization system according to claim 3, wherein the experimental traveling design creation device further designs the multiple number of times of traveling to optimize the designated parameter without changing a parameter other than the designated parameter, among all the sets of multiple types of parameters, for each travel.

5. The traveling parameter optimization system according to claim 3, wherein the experimental traveling design creation device further designs the multiple number of times of traveling to change the designated parameter as the travel parameter that is the optimization target, among all the sets of multiple types of parameters, so as to optimize the designated parameter with respect to each designated parameter.

6. The traveling parameter optimization system according to claim 1, wherein the experimental traveling design creation device further designs the experimental traveling design by a design of an experiment method using a Bayesian optimization method.

7. The traveling parameter optimization system according to claim 1, wherein the experimental traveling design creation device further uses the traveling parameter in each of the at least one experimental travel from first traveling to N-th traveling as an explanatory variable, uses the evaluation value in each of the at least one experimental travel from the first traveling to the N-th traveling as an objective variable, constructs a regression model by Gaussian process regression, calculates an acquisition function based on the regression model, and determines the traveling parameter for N+1-th traveling based on the acquisition function.

8. The traveling parameter optimization system according to claim 1, wherein the traveling parameter optimization device calculates the optimized traveling parameter using a Bayesian optimization method.

9. The traveling parameter optimization system according to claim 1, wherein the traveling parameter optimization device further uses the traveling parameter in each of the at least one experimental travel from first traveling to M-th traveling as an explanatory variable, uses the evaluation value in each of the at least one experimental travel from the first traveling to the M-th traveling as an objective variable, constructs a regression model by Gaussian process regression, and calculates, as the optimized traveling parameter, a traveling parameter with which an expected value of the objective variable is closest to a setting value based on the regression model.

10. The traveling parameter optimization system according to claim 1, further comprising a traveling parameter storage that stores a past traveling parameter calculated in past by the traveling parameter optimization device, wherein
    the experimental traveling design creation device is capable of setting the past traveling parameter stored in the traveling parameter storage as a default value of the traveling parameter to create the experimental traveling design for the at least one experimental travel.

11. The traveling parameter optimization system according to claim 1, wherein
    the traveling parameter further includes a different traveling parameter set for each class of a velocity, and
    the different traveling parameter is optimized for each class of the velocity as a second optimization target.

12. The traveling parameter optimization system according to claim 1, wherein
    the traveling parameter comprises a different traveling parameter set for each traveling route of the plurality of automatic traveling devices, and
    the travel parameter optimization device further optimizes the traveling parameter for each traveling route of the plurality of automatic traveling devices.

13. The traveling parameter optimization system according to claim 12, wherein the traveling instruction device further transmits the traveling instruction to the designated automatic traveling device so as to cause the designated automatic traveling device to travel along a traveling route using the optimized traveling parameter.

14. The traveling parameter optimization system according to claim 1, wherein the evaluation value includes a lateral shift amount with respect to a designated linear traveling route when the plurality of automatic traveling devices travels along the linear traveling route.

15. The traveling parameter optimization system according to claim 1, wherein the evaluation value includes a magnitude of change in an acceleration rate due to acceleration or a magnitude of change in a deceleration rate due to deceleration when the plurality of automatic traveling devices travels.

16. The traveling parameter optimization system according to claim 1, wherein the traveling parameter includes a parameter for steering control when the plurality of automatic traveling devices travels along a designated linear traveling route.

17. The traveling parameter optimization system according to claim 1, wherein the traveling parameter includes a parameter for acceleration rate control or for deceleration rate control when the plurality of automatic traveling devices travels.

18. A traveling parameter optimization method for optimizing a traveling parameter of a plurality of automatic traveling devices that travelasil based on a traveling instruction by conducting at least one experimental travel, the traveling parameter optimization method comprising:

creating an experimental traveling design for the at least one experimental travel;

transmitting the traveling instruction to the plurality of automatic traveling devices based on the created experimental traveling design;

acquiring a measurement value that reflects a traveling state of the plurality of automatic traveling devices;

calculating an evaluation value based on the acquired measurement value; and calculating an optimized traveling parameter based on the calculated evaluation value in the at least one experimental travel, wherein the traveling parameter includes a different traveling parameter set for each class of a load, which is a weight of a cargo pulled or loaded by each of the plurality of automatic traveling devices, the traveling parameter is optimized for each class of the load of an optimization target, and the method further comprises observing the load of the cargo transported by each of the plurality of automatic traveling devices, designating, out of the plurality of the automatic traveling devices, an automatic traveling device whose load is in the range of the load value of the class of the load of an optimization target in the experimental traveling design as a designated automatic traveling device that performs the at least one experimental travel, and transmitting the traveling instruction to the designated automatic traveling device.

* * * * *